United States Patent
Kojima et al.

(10) Patent No.: US 6,751,184 B2
(45) Date of Patent: Jun. 15, 2004

(54) INFORMATION RECORDING MEDIUM, METHOD FOR PRODUCING THE SAME, AND RECORDING/REPRODUCING METHOD USING THE SAME

(75) Inventors: Rie Kojima, Osaka (JP); Takashi Nishihara, Osaka (JP); Noboru Yamada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 544 days.

(21) Appl. No.: 09/903,285

(22) Filed: Jul. 11, 2001

(65) Prior Publication Data

US 2002/0024913 A1 Feb. 28, 2002

(30) Foreign Application Priority Data

Jul. 13, 2000 (JP) ........................................ 2000-212338
Apr. 26, 2001 (JP) ........................................ 2001-128904

(51) Int. Cl.[7] .............................. G11B 7/00; G11B 7/24
(52) U.S. Cl. ..................... 369/275.2; 369/94; 369/288; 428/64.2; 430/270.13
(58) Field of Search .............................. 369/275.2, 288, 369/275.4, 94, 283; 428/64.1, 64.2, 64.3, 64.6, 64.4, 64.9; 430/270.13, 270.11, 270.14, 270.1

(56) References Cited

U.S. PATENT DOCUMENTS

| | | | |
|---|---|---|---|
| 5,764,619 A | | 6/1998 | Nishiuchi et al. |
| 6,268,034 B1 | * | 7/2001 | Kitaura et al. ............. 428/64.1 |
| 6,456,584 B1 | * | 9/2002 | Nagata et al. ............ 369/275.2 |
| 6,514,591 B1 | * | 2/2003 | Nagata et al. ................. 369/94 |
| 6,554,972 B1 | * | 4/2003 | Ichihara et al. ......... 430/270.13 |
| 6,632,583 B2 | * | 10/2003 | Kunitomo et al. ........ 369/275.2 |

FOREIGN PATENT DOCUMENTS

| | | |
|---|---|---|
| EP | 0 810 590 | 3/1997 |
| EP | 0 957 477 | 11/1999 |
| JP | 2-147289 | 6/1990 |
| JP | 2000-36130 A | 2/2000 |

OTHER PUBLICATIONS

"Thinning Limitation of Ge–Sb–Te Recording Film for High Transmittance Media", Proc. of PCOS '99, pp. 83–88.
Kubota et al. "Wave Optics", 1971, pp. 199–236, and partial translation.

* cited by examiner

Primary Examiner—Thang V. Tran
(74) Attorney, Agent, or Firm—Merchant & Gould P.C.

(57) ABSTRACT

An information recording medium of the present invention includes a first substrate, a second substrate disposed so as to be opposed to the first substrate, a first information layer disposed between the first substrate and the second substrate, a second information layer disposed between the first information layer and the second substrate, and an intermediate layer disposed between the first information layer and the second information layer. The first information layer includes a first recording layer that is transformed in phase reversibly between a crystal phase and an amorphous phase with a laser beam, and the second information layer includes a second recording layer that is transformed in phase reversibly between a crystal phase and an amorphous phase. The first recording layer contains, Ge, Sn, Sb, and Te, and has a thickness of 9 nm or less.

26 Claims, 6 Drawing Sheets

INFORMATION RECORDING MEDIUM, METHOD FOR PRODUCING THE SAME, AND RECORDING/REPRODUCING METHOD USING THE SAME

BACKGROUND OF THE INVENTION

1. Field of the Invention

The present invention relates to an information recording medium for optically recording, erasing, rewriting, and reproducing information, a method for producing the same, and a method for recording/reproducing information with respect to the same.

2. Description of the Related Art

In a phase-change information recording medium, information is recorded, erased and rewritten using a recording layer that is transformed in phase reversibly between a crystal phase and an amorphous phase. When this recording layer is irradiated with a high power laser beam and then is cooled rapidly, a portion thus irradiated is changed to be in an amorphous phase. Similarly, when an amorphous portion of the recording layer is irradiated with a low power laser beam and then is cooled slowly, the portion thus irradiated is changed to be in a crystal phase. Therefore, in the phase-change information recording medium, the recording layer is irradiated with laser beams having powers modulated between a high power level and a low power level, whereby the information layer can be changed freely to be in an amorphous phase or a crystal phase. In the phase-change information recording medium, information is recorded using the difference in reflectivity between an amorphous phase and a crystal phase.

In recent years, in order to enhance the recording density of an information recording medium, various techniques have been studied. For example, there are techniques of recording a smaller recording mark using a violet laser beam and of recording a smaller recording mark by making a substrate thinner on a light incident side while using a lens with a large numerical aperture. A technique of recording/reproducing information with respect to two recording layers using a laser beam incident from one side also has been studied (see JP 12(2000)-36130 A).

In order to decrease the size of a recording mark, it is necessary to shorten an irradiation time of a laser beam used for changing a phase of a recording layer. This requires that the crystallization speed of the recording layer should be high. Furthermore, in order to record/reproduce information with respect to two recording layers, it is required to use a thin recording layer on a light incident side so that sufficient light reaches a recording layer on the back side. However, when the recording layer is thinned, the number of atoms contained in the recording layer is decreased, and the movement of atoms involved in a phase change also is suppressed, which lowers the crystallization speed. Therefore, there is a demand for a material capable of forming a recording layer on which information can be recorded with reliability irrespective of its thinness.

Conventionally, as a material for a recording layer, Ge—Sb—Te system materials have been used. According to an experiment by the inventors of the present invention, it is found that, among them, a pseudo binary composition GeTe—$Sb_2Te_3$ has the highest crystallization speed, and $Ge_2Sb_2Te_5$ ((GeTe): ($Sb_2Te_3$)=2:1) has excellent characteristics. Furthermore, Uno et al. report a recording/reproducing experiment using a Ge—Sb—Te recording layer with a thickness of 6 nm (M. Uno, K. Nagata and N. Yamada, "Thinning Limitation of Ge—Sb—Te Recording Film for High Transmittance Media", Proc. of PCO'99. 83–88). In this experiment, information was erased at a linear velocity of 9 m/s using a laser with a wavelength of 660 nm, and a satisfactory erasure ratio (30 dB) was obtained.

However, when the inventors conducted an experiment on a Ge—Sb—Te system material, using a violet laser with a wavelength of 405 nm, this material was found to be insufficient for use on a light incident side. Therefore, in a conventional recording layer, it was difficult to realize an information recording medium having a two-layered structure, with respect to which information is recorded/reproduced using a violet laser.

JP 2(1990)-147289 A reports that an information recording medium is obtained that has excellent repeated-recording/erasing characteristics and less change in an erasure ratio with time by adding Sb to Te—Ge—Sn of a recording layer so as to limit the content of each element. However, this is an experimental result in the case where an information recording medium includes only one recording layer, and the recording layer is thick (i.e., 30 to 100 nm). This publication does not show the effects of addition of Sn in the case where the recording layer is thinned.

SUMMARY OF THE INVENTION

Therefore, with the foregoing in mind, it is an object of the present invention to provide a high-density recordable information recording medium having two recording layers, a method for producing the same, and a method for recording/reproducing information with respect to the same.

In order to achieve the above-mentioned object, an information recording medium of the present invention includes: a first substrate; a second substrate disposed so as to be opposed to the first substrate; a first information layer disposed between the first substrate and the second substrate; a second information layer disposed between the first information layer and the second substrate; and an intermediate layer disposed between the first information layer and the second information layer, wherein the first information layer includes a first recording layer that is transformed in phase reversibly between a crystal phase and an amorphous phase with a laser beam radiated from the first substrate side, the second information layer includes a second recording layer that is transformed in phase reversibly between a crystal phase and an amorphous phase with the laser beam, and the first recording layer contains Ge, Sn, Sb, and Te, and has a thickness of 9 nm or less.

In the above-mentioned information recording medium, the first recording layer may be made of a material represented by a composition formula: $(Ge-Sn)_A Sb_B Te_{3+A}$, where $2 \leq A \leq 22$ and $2 \leq B \leq 4$. This composition formula represents that Ge and Sn are contained in the material by $100*A/(2A+B+3)$ atomic % in total. According to this constitution, even when the first recording layer is made thin, satisfactory recording/erasing characteristics are obtained with a violet laser. By setting $2 \leq A$, an amplitude of a signal can be increased. Furthermore, by setting $A \leq 22$, a decrease in crystallization speed can be prevented. By setting $2 \leq B$, Te, which has a low melting point, can be prevented from being precipitated when a phase change between a crystal phase and an amorphous phase is effected. In the case of $2 < B$, an excess amount of Sb is added to the material represented by $(Ge-Sn)_A Sb_2 Te_{3+A}$. This excess amount of Sb functions to increase a crystallization temperature to enhance thermal stability of a recording mark, and suppressing the movement of a substance during repeated-recording.

In the above-mentioned information recording medium, a content of Sn in the first recording layer may be 25 atomic % or less. The content of Sn preferably is 0.1 atomic % or more. According to this constitution, even when the first recording layer is made thin, a satisfactory erasure ratio is obtained with a violet laser. Furthermore, by adjusting the content of Sn in the first recording layer and B, the crystallization speed and the crystallization temperature of the first recording layer can be controlled.

In the above-mentioned information recording medium, a transmittance Tc (%) of the first information layer in a case where the first recording layer is in a crystal phase, and a transmittance Ta (%) of the first information layer in a case where the first recording layer is in an amorphous phase may satisfy $40 \leq (Tc+Ta)/2$ with respect to a laser beam having a wavelength in a range of 390 nm to 430 nm. According to this constitution, satisfactory recording/erasing characteristics also are obtained in the second information layer.

In the above-mentioned information recording medium, the transmittance Tc (%) and the transmittance Ta (%) may satisfy $0 \leq |Tc-Ta|/Tc \leq 0.15$ (more preferably, $0 \leq |Tc-Ta|/Tc \leq 0.05$) with respect to a laser beam having a wavelength in a range of 390 nm to 430 nm. According to this constitution, a change in recording sensitivity of the second information layer can be decreased irrespective of a recorded state of the first information layer In the above-mentioned information recording medium, the first information layer further may include first and second dielectric layers and a first reflective layer, and the first reflective layer, the second dielectric layer, the first recording layer and the first dielectric layer may be disposed in this order from the intermediate layer side to the first substrate side. According to this constitution, by varying a material and a thickness of the dielectric layers and the reflective layers, the light absorptivity of the first recording layer, and the transmittance and the reflectivity of the first information layer can be controlled.

In the above-mentioned information recording medium, the first information layer further may include a third dielectric layer disposed between the first reflective layer and the intermediate layer. According to this constitution, by varying a material and a thickness of the third dielectric layer, the transmittance of the first information layer can be increased.

In the above-mentioned information recording medium, a refractive index of the third dielectric layer may be 2.3 or more with respect to light having a wavelength in a range of 390 nm to 430 nm.

In the above-mentioned information recording medium, grooves for tracking control may be formed on the intermediate layer.

In the above-mentioned information recording medium, the first information layer further may include an interface layer disposed at at least one interface selected from the group consisting of an interface between the first dielectric layer and the first recording layer, an interface between the first recording layer and the second dielectric layer, an interface between the second dielectric layer and the first reflective layer, and an interface between the first reflective layer and the third dielectric layer. According to this constitution, the movement of a substance between layers can be suppressed, so that an information recording medium with high reliability is obtained.

In the above-mentioned information recording medium, a thickness of the first reflective layer may be in a range of 5 nm to 15 nm. According to this constitution, the transmittance Tc (%) and Ta (%) of the first information layer can be enhanced, and the first recording layer easily can be changed to be in an amorphous phase by rapidly diffusing heat generated therein. When the first reflective layer is too thin, its heat diffusion function is insufficient, and when it is too thick, the transmittance of the first information layer becomes insufficient. Therefore, the thickness of the first reflective layer preferably is set in a range of 5 nm to 15 nm.

In the above-mentioned information recording medium, a thickness of the first substrate may be in a range of 10 µm to 700 µm. According to this constitution, by varying a numerical aperture NA of an objective lens, the length of a recording mark and the interval between recording marks can be optimized in accordance with the shape of grooves of the first substrate and recording/erasing/reproducing conditions.

In the above-mentioned information recording medium, grooves for tracking control may be formed on the first substrate.

In the above-mentioned information recording medium, a thickness of the second substrate may be in a range of 500 µm to 1300 µm. According to this constitution, by varying a numerical aperture NA of an objective lens, the length of a recording mark and the interval between recording marks can be optimized in accordance with the shape of grooves of the first substrate and recording/erasing/reproducing conditions. The thickness of the second substrate is selected so that the thickness of the information recording medium becomes about 1200 µm. In the case where the thickness of the first substrate is about 100 µm, the thickness of the second substrate is set to be about 1100 µm. Furthermore, in the case where the thickness of the first substrate is about 600 µm, the thickness of the second substrate is set to be about 600 µm.

In the above-mentioned information recording medium, grooves for tracking control may be formed on the second substrate.

In the above-mentioned information recording medium, the second information layer further may include fourth and fifth dielectric layers and a second reflective layer, and the second reflective layer, the fifth dielectric layer, the second recording layer and the fourth dielectric layer may be disposed in this order from the second substrate side to the intermediate layer side. According to this constitution, by varying a material and a thickness of the dielectric layers and the reflective layers, the light absorptivity of the second recording layer and the reflectivity of the second information layer can be controlled.

In the above-mentioned information recording medium, the second information layer further may include an interface layer disposed at at least one interface selected from the group consisting of an interface between the fourth dielectric layer and the second recording layer, an interface between the second recording layer and the fifth dielectric layer, and an interface between the fifth dielectric layer and the second reflective layer.

Furthermore, a method for producing an information recording medium of the present invention is a method for producing an information recording medium including first and second substrates, first and second information layers, and an intermediate layer, the method including the processes of: (a) forming the second information layer on the second substrate; (b) forming the intermediate layer on the second information layer; (c) forming the first information layer on the intermediate layer; and (d) attaching the first substrate on the first information layer, wherein the first information layer includes a first recording layer that is transformed in phase reversibly between a crystal phase and an amorphous phase with a laser beam radiated from the first substrate side, the second information layer includes a second recording layer that is transformed in phase reversibly between a crystal phase and an amorphous phase with the laser beam, and the process (c) includes the process of forming the first recording layer to a thickness of 9 nm or less, using a base material containing Ge, Sn, Sb, and Te. According to this production method, the information recording medium of the present invention can be produced easily. Furthermore, according to this production method, since the first substrate is stacked after the second information layer and the first information layer are formed, an information recording medium provided with a first thin substrate can be produced easily.

According to the above-mentioned production method, in the process (c), the first recording layer may be formed by sputtering using sputtering gas containing argon gas or krypton gas. According to this constitution, an information recording medium with excellent repeated-recording characteristics can be formed easily.

According to the above-mentioned production method, the sputtering gas further may contain at least one gas selected from the group consisting of oxygen and nitrogen.

According to the above-mentioned production method, the first recording layer may be formed at a film-formation speed in a range of 0.1 nm/second to 10 nm/second. According to this constitution, the variations in thickness of the first recording layer can be decreased, and the first recording layer can be produced with good productivity in a short period of time.

According to the above-mentioned production method, in the process (b), grooves for tracking control may be formed on a surface of the intermediate layer.

Furthermore, according to the above-mentioned production method, the first information layer further may include a first reflective layer disposed on the intermediate layer side from the first recording layer, and the process (c) may include the process of forming the first reflective layer in a range of 5 nm to 15 nm.

Furthermore, a recording/reproducing method of the present invention is a method for recording/reproducing an information signal by irradiating an information recording medium with a laser beam, wherein the information recording medium is the above-mentioned information recording medium of the present invention, the laser beam is incident from the first information layer side of the information recording medium, in the second information layer of the information recording medium, information is recorded/reproduced with the laser beam transmitted through the first information layer, and a wavelength of the laser beam is in a range of 390 nm to 430 nm. According to this recording/reproducing method, high-density recording can be conducted with high reliability.

In the above-mentioned recording/reproducing method, a linear velocity of the information recording medium in recording/reproducing information may be in a range of 1 m/second to 50 m/second. According to this constitution, the length of a recording mark and the interval between recording marks can be optimized in accordance with the structure of an information recording medium and recording/reproducing conditions, and a high transfer rate can be realized.

In the above-mentioned recording/reproducing method, the laser beam may be a laser beam condensed by an objective lens with a numerical aperture NA in a range of 0.4 to 1.1. According to this constitution, the length of a recording mark and the interval between recording marks can be optimized in accordance with the thickness of the first substrate or the second substrate, the shape of grooves, and recording/erasing/reproducing conditions, and a high transfer rate can be realized.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative embodiments with reference to the drawings. The following embodiments are shown merely for illustrative purpose, and the present invention is not limited thereto.

Embodiment 1

Figure 1:
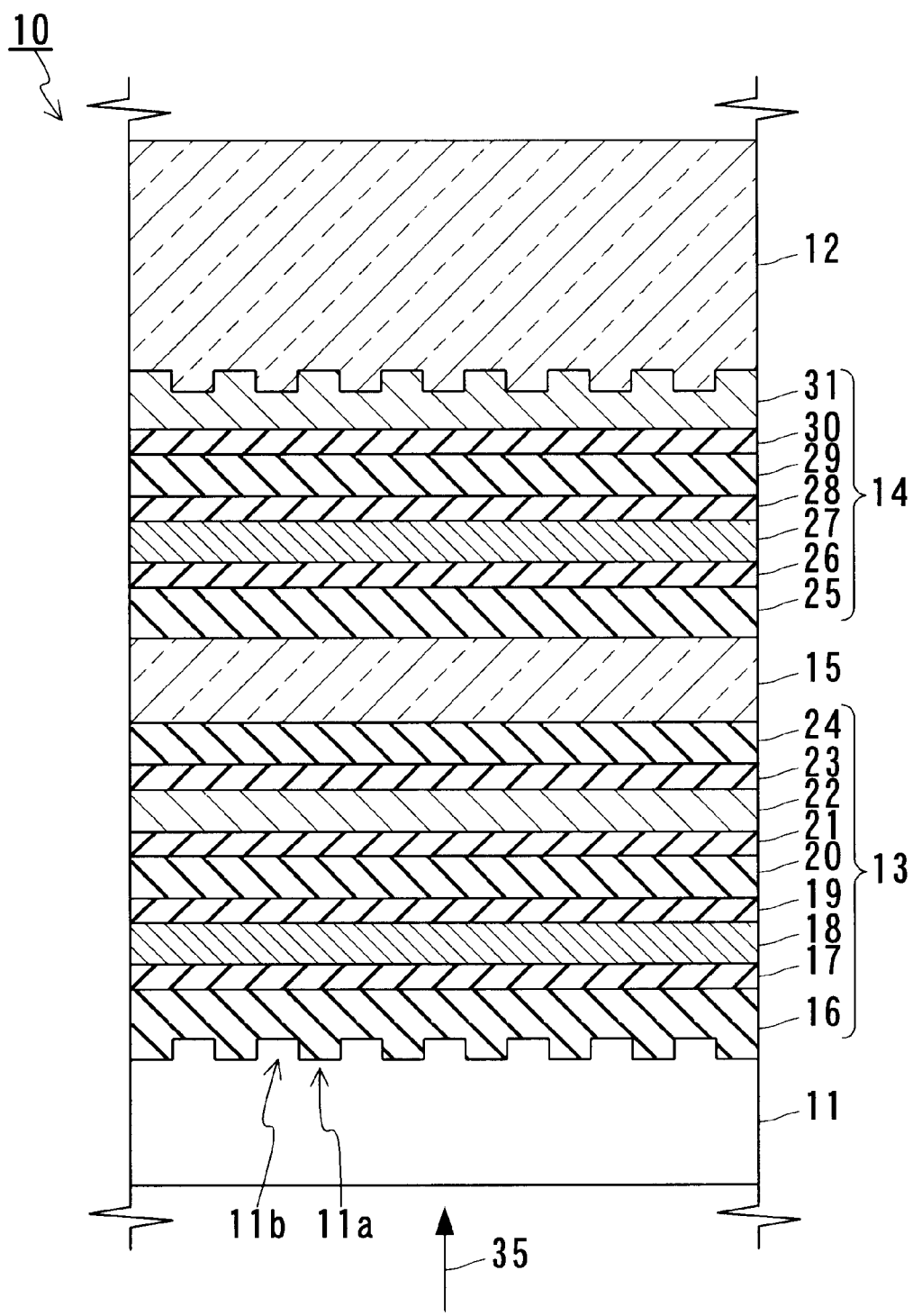
FIG. 1 is a partial cross-sectional view showing an exemplary information recording medium of the present invention.

In Embodiment 1, an exemplary information recording medium of the present invention will be described. FIG. 1 shows a partial cross-sectional view of an information recording medium 10 of Embodiment 1.

Referring to FIG. 1, the information recording medium 10 includes a first substrate 11 (hatching is omitted), a second substrate 12 disposed so as to be opposed to the first substrate 11, a first information layer 13 disposed between the first substrate 11 and the second substrate 12, a second information layer 14 disposed between the first information layer 13 and the second substrate 12, and an intermediate layer 15 disposed between the first information layer 13 and the second information layer 14. Information is recorded/reproduced with respect to the information recording medium 10 with a laser beam 35 incident from the first substrate 11 side.

The first substrate 11 and the second substrate 12 are respectively disk-shaped transparent substrates. As shown in FIG. 1, grooves for tracking control may be formed, if required, on the inner surfaces (on the intermediate layer 15 side) of the first substrate 11 and the second substrate 12. The outer surfaces of the first substrate 11 and the second substrate 12 generally are smooth. In the case where grooves are formed on the substrate, information may be recorded on grooves 11a (groove surface closer to the incident side of the laser beam 35) or on portions (groove surface far away from the incident side of the laser beam 35, hereinafter, referred to as "lands 11*b*") between the grooves 11*a*. Information also may be recorded on both the grooves 11*a* and the lands 11*b*.

The first substrate 11 and the second substrate 12 can be made of glass or resin such as polycarbonate, amorphous polyolefin, and polymethylmethacrylate (PMMA). Among them, polycarbonate resin is preferable because this resin makes it easy to form grooves and has good productivity. It is preferable that the first substrate 11 has a small birefringence with light of a wavelength in a range of 390 nm to 430 nm. The thickness of the first substrate 11 preferably is in a range of 10 $\mu$m to 700 $\mu$m (more preferably, 50 $\mu$m to 150 $\mu$m). As the first substrate 11 becomes thinner, the numerical aperture of an objective lens can be increased, and the laser beam 35 can be focused. For example, in the case where the thickness of the first substrate 11 is 100 $\mu$m, information can be recorded/erased satisfactorily by using an objective lens with a numerical value of 0.85. Furthermore, in the case where the thickness of the first substrate 11 is 600 $\mu$m, information can be recorded/erased satisfactorily by using an objective lens with a numerical value of 0.6. The thickness of the second substrate 12 preferably is in a range of 500 $\mu$m to 1300 $\mu$m (more preferably, 900 $\mu$m to 1300 $\mu$m).

The first information layer 13 includes a third dielectric layer 24, a fourth interface layer 23, a first reflective layer 22, a third interface layer 21, a second dielectric layer 20, a second interface layer 19, a first recording layer 18, a first interface layer 17, and a first dielectric layer 16 that are disposed successively from the intermediate layer 15 side to the first substrate 11 side. Furthermore, the second information layer 14 includes a second reflective layer 31, a seventh interface layer 30, a fifth dielectric layer 29, a sixth interface layer 28, a second recording layer 27, a fifth interface layer 26 and a fourth dielectric layer 25 that are disposed successively from the second substrate 12 side to the intermediate layer 15 side.

It is preferable that a transmittance Tc (%) of the first information layer 13 in the case where the first recording layer 18 is in a crystal phase and a transmittance Ta (%) of the first information layer 13 in the case where the first recording layer 18 is in an amorphous phase satisfy $40 \leq (Tc+Ta)/2$ with respect to a laser beam having a wavelength in a range of 390 nm to 430 nm. It also is preferable that Tc and Ta satisfy $0 \leq |Tc-Ta|/Tc \leq 0.15$ (more preferably, $0 \leq |Tc-Ta|/Tc \leq 0.05$).

The first, second and third dielectric layers 16, 20 and 24 have a function of protecting the first recording layer 18 from the environment. Furthermore, by selecting a thickness and a material for each layer, the light absorptivity (%) of the first recording layer 18, and the reflectivity and transmittance of the first information layer 13 can be controlled with the use of light interference.

Each thickness of the above-mentioned dielectric layers can be determined, for example, by using calculation based on a matrix method (see "Wave Optics" by Hiro Kubota, Iwanami-shoten, 1971, Ch. 3). More specifically, each thickness can be determined strictly so as to satisfy the conditions that |Rc−Ra| or Rc/Ra becomes larger and Tc and Ta become larger. Herein, Rc and Tc represent a reflectivity (%) and a transmittance (%) of the first information layer 13 in the case where the first recording layer 18 is in a crystal phase. Ra and Ta represent a reflectivity (%) and a transmittance (%) of the first information layer 13 in the case where the first recording layer 18 is in an amorphous phase.

Each complex refractive index of the dielectric layers in the vicinity of a wavelength of 400 nm is an important factor for determining the light absorptivity of the first recording layer 18, and the reflectivity and transmittance of the first information layer 13. A complex refractive index is represented by (n−k·i) (where n is a refractive index, and k is an extinction coefficient). In order to keep large Tc and Ta, it is desirable that transparency of the dielectric layers is high. More specifically, it is desirable that an extinction coefficient k is 0.1 or less.

Regarding the refractive index of the dielectric layers, the inventors investigated the influence of a refractive index n1 of the first dielectric layer 16, a refractive index n2 of the second dielectric layer 20, and a refractive index n3 of the third dielectric layer 24 on the reflectivity and the transmittance of the first information layer 13 by simulation using the matrix method. This simulation was conducted assuming that the thickness of the first recording layer 18 is 6 nm, and that of the first reflective layer 22 is 10 nm. Consequently, the following results were obtained. In the case where the refractive indexes n1, n2, and n3 satisfy the relationships: $1.7 \leq n1 \leq 2.5$, $1.7 \leq n2 \leq 2.8$, and $2.0 \leq n3$, the thickness of the dielectric layers that allows |Rc−Ra| or Rc/Ra to be large and satisfies $40 \leq (Tc+Ta)/2$ can be determined. Furthermore, in the case where n1, n2, and n3 satisfy the relationships: $2.1 \leq n1 \leq 2.4$, $2.0 \leq n2 \leq 2.8$, and $2.2 \leq n3$, Ra can be set to be small, so that the thickness that allows Rc/Ra to be large and satisfies $50 \leq (Tc+Ta)/2$ can be determined.

In this manner, the first, second and third dielectric layers 16, 20 and 24 have a function of increasing a transmittance (Tc and Ta) of the first information layer 13. Among them, the third dielectric layer 24 particularly is important, and it is preferable that the third dielectric layer 24 is made of a material with a large refractive index (e.g., a material with a refractive index of 2.3 or more). It also was confirmed by calculation that in the presence of the third dielectric layer 24, the transmittance of the first information layer 13 is increased by 5% to 10% in an absolute value, compared with the case where there is no third dielectric layer 24.

Next, preferable thermal characteristics of the dielectric layers will be described. In order to form a satisfactory recording mark on the first recording layer 18, it is important to allow heat generated in the first recording layer 18 due to light absorption to radiate rapidly in a thickness direction and to cool the first recording layer 18 rapidly. Because of this, it is preferable that the first dielectric layer 16 and the second dielectric layer 20 are made of a material with a relatively small heat conductivity. When a material with a large heat conductivity is used, heat is likely to radiate in an in-plane direction, which relatively decreases a rapid cooling speed of the first recording layer 18. In order to increase a rapid cooling speed of the first recording layer 18, it is preferable that the third dielectric layer 24 formed on the first reflective layer 22 is made of a material with a relatively large heat conductivity.

The first, second, and third dielectric layers 16, 20, and 24 are made of a material satisfying the above-mentioned optical and thermal conditions. These dielectric layers can be made of an oxide, a nitride, an oxide nitride, a sulfide, a carbide, or a mixture thereof. As the oxide, for example, $In_2O_3$, $Nb_2O_5$, SnO, $TiO_2$, MgO, ZnO, $ZrO_2$, $TeO_2$, $Al_2O_3$, $SiO_2$ or $Ta_2O_5$ can be used. As the nitride, for example, Si—N, Al—N, Ti—N, Ta—N, Zr—N or Ge—N can be used. As the oxide nitride, for example, Al—O—N or Si—O—N can be used. As the sulfide, for example, ZnS can be used. As the carbide, for example, SiC can be used. As the mixture, for example, ZnS—$SiO_2$ can be used.

Among them, ZnS—$SiO_2$ is suitable for the first dielectric layer 16 and the second dielectric layer 20. ZnS—$SiO_2$ is a transparent amorphous material with a refractive index of about 2.3, which has a high film formation speed, and excellent mechanical properties and moisture resistance. A material with a refractive index of 2.3 or more such as $TeO_2$, $ZnO$, $Ta_2O_5$, $ZrO_2$ or $TiO_2$ is suitable for the third dielectric layer 24.

The first interface layer 17 and the second interface layer 19 have a function of preventing a substance from moving between the first dielectric layer 16 and the first recording layer 18 and between the first recording layer 18 and the second dielectric layer 20. Furthermore, the third interface layer 21 and the fourth interface layer 23 prevent a substance from moving between the second dielectric layer 20 and the first reflective layer 22 and between the first reflective layer 22 and the third dielectric layer 24. For example, in the case of using a dielectric layer made of $ZnS$—$SiO_2$, sulfur in the dielectric layer is prevented from diffusing to the first recording layer 18 and the first reflective layer 22. These interface layers may be omitted. However, in the case of using a dielectric layer made of a sulfide, it is preferable to form interface layers. In order to increase a transmittance of the first information layer 13, it is preferable that the number of interface layers is as small as possible.

As a material for these interface layers, a nitride such as Si—N, Al—N, Zr—N, Ti—N, Ge—N and Ta—N, or a nitride oxide including such a nitride can be used. A carbide such as C and SiC also can be used. Among them, a material containing Ge—N can be formed into a film by reactive sputtering and has excellent mechanical properties and moisture resistance. When the thickness of the interface layers is increased, the reflectivity and absorptivity of the first information layer 13 are varied largely. Therefore, the thickness of the interface layers preferably is in a range of 1 nm to 10 nm (more preferably 3 nm to 7 nm).

The first recording layer 18 is made of a phase-change material that is transformed in phase reversibly between a crystal phase and an amorphous phase by irradiation with a laser beam. Specifically, the first recording layer 18 contains Ge, Sn, Sb, and Te. More specifically, a material obtained by replacing a part of Ge of a material represented by $Ge_A Sb_B Te_{3+A}$ with Sn, i.e., a material represented by a composition formula: $(Ge—Sn)_A Sb_B Te_{3+A}$ (where $2 \leq A \leq 22$, $2 \leq B \leq 4$). This composition formula represents that Ge and Sn are contained in the first recording layer 18 by $100*A/(2A+B+3)$ atomic % in total. In order to obtain an information recording medium with excellent repeated-recording performance, it is more preferable that A satisfies $2 \leq A \leq 10$. The thickness of the first recording layer 18 is 9 nm or less, preferably in a range of 3 nm to 9 nm.

A pseudo binary composition $GeTe$—$Sb_2 Te_3$ conventionally has been used as a material with a high crystallization speed. This crystallization speed can be increased further by dissolving SnTe or PbTe therein. Like a pseudo binary composition $GeTe$—$Sb_2 Te_3$, SnTe and PbTe have a crystal structure of the rock-salt type. SnTe and PbTe have a high crystallization speed and are likely to be dissolved in Ge—Sb—Te. The inventors found that SnTe is preferable as a material to be dissolved in the pseudo binary composition $GeTe$—$Sb_2 Te_3$. The use of this material enables a smaller recording mark to be recorded on a recording layer at a shorter interval with a small laser beam spot. It also is useful to add PbTe in place of SnTe. In this case, the preferable amount of Pb is substantially the same as that of Sn.

As described above, $GeTe$—$SnTe$—$Sb_2 Te_3$ obtained by mixing SnTe with a pseudo binary composition $GeTe$—$Sb_2 Te_3$ can be used as a material for the first recording layer 18. In this case, Ge is partially replaced with Sn to obtain (Ge—Sn)Te—$Sb_2 Te_3$, and hence, a crystallization speed is increased. Furthermore, by adding an excess amount of Sb to (Ge—Sn)Te—$Sb_2 Te_3$ to obtain (Ge—Sn)Te—$Sb_2 Te_3$—Sb, a crystallization temperature as well as a crystallization speed can be increased. This results in enhancement of the thermal stability of a recording mark. Furthermore, an excess amount of Sb becomes amorphous Sb without entering a crystal lattice, thereby suppressing the movement of a substance during repeated-recording.

In the case of using a material represented by $(Ge—Sn)_A Sb_B Te_{3+A}$, by setting $2 \leq A$, a sufficient signal amplitude is obtained in the range of a wavelength of a violet laser. By setting $A \leq 22$, an increase in a melting point and a decrease in crystallization speed can be prevented. Furthermore, by setting $2 \leq A \leq 10$, an information recording medium with excellent repeated-recording characteristics can be obtained.

Next, in the case where a material represented by $(Ge—Sn)_A Sb_B Te_{3+A}$ is used, the content of Sn in the material will be described. In the case of A=B=2, it is preferable that a content Y (atomic %) of Sn contained in the first recording layer 18 satisfies $0<Y \leq 11$. Furthermore, in the case where A=2 and B=4, $0<Y \leq 15$ is preferable. Furthermore, in the case where A=22 and B=2, $0<Y \leq 22$ is preferable. In the case where A=22 and B=4, $0<Y \leq 25$ is preferable. Thus, it is preferable that the content of Sn in the above-mentioned material is 25 atomic % or less. When the concentration of Sn is too large, a change in refractive index between a crystal phase and an amorphous phase of the first recording layer 18 becomes small, which may decrease recording characteristics.

Figure 2:
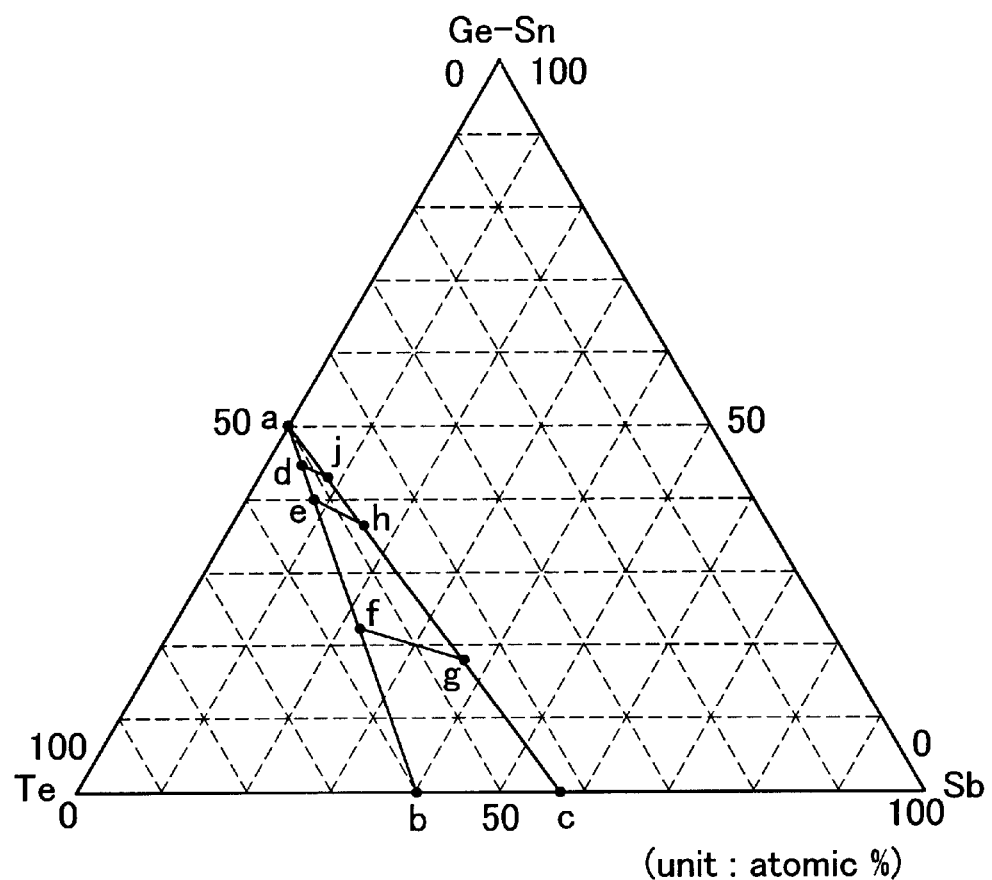
FIG. 2 is a diagram showing a composition range of a first recording layer in the information recording medium of the present invention.

Referring to FIG. 2, a preferable composition range of the first recording layer 18 will be described. FIG. 2 shows coordinates of a concentration (atomic %) of (Ge—Sn), a concentration (atomic %) of Sb, and a concentration (atomic %) of Te. A point "a" is placed at [(Ge—Sn), Sb, Te] (hereinafter, displayed in this order)=(50, 0, 50) and represents (Ge—Sn)Te. A point "b" is placed at a coordinate (0, 40, 60) and represents $Sb_2 Te$. Thus, a line "a–b" represents a composition of $(Ge—Sn)_A Sb_2 Te_{3+A}$. A point "c" is placed at a coordinate (0, 57.1, 42.9) and represents $Sb_4 Te_3$. Thus, a line "a–c" represents a composition of $(Ge—Sn)_A Sb_4 Te_{3+A}$. A point "d" is placed at a coordinate (44.9, 4.1, 51.0) and represents a composition of A=22 and B=2. A point "e" is placed at a coordinate (40, 8, 52) and represents a composition of A=10 and B=2. A point "f" is placed at a coordinate (22.2, 22.2, 55.6) and represents a composition of A=2 and B=2. A point "g" is placed at a coordinate (18.2, 36.4, 45.4) and represents a composition of A=2 and B=4. A point "h" is placed at a coordinate (37, 14.8, 48.2) and represents a composition of A=10 and B=4. A point "j" is placed at a coordinate (43.1, 7.8, 49.1) and represents a composition of A=22 and B=4. Thus, a range surrounded by d–f–g–j represents a composition of $2 \leq A \leq 22$ and $2 \leq B \leq 4$. A range surrounded by e–f–g–h represents a composition of $2 \leq A < 10$ and $2 \leq B \leq 4$. A line "d–f" represents a composition of $2 \leq A \leq 22$ and B=2. A line "e–f" represents a composition of $2 \leq A \leq 10$ and B=2.

When the first recording layer 18 with a thickness of 6 nm is formed by using a material represented by $(Ge—Sn)_A Sb_B Te_{3+A}$, by selecting the concentration of A, B, and Sn, satisfactory recording/erasing performance can be obtained even in the case where a laser beam with a short wavelength (i.e., 390 nm to 430 nm) is used.

A material obtained by adding another element to $(Ge—Sn)_A Sb_B Te_{3+A}$ may be used for the first recording layer 18. Such a material is represented by a composition formula: $[(Ge—Sn)_A Sb_B Te_{3+A}]_{100-C} M_C$ (where $0<C \leq 20$). As the element M, at least one element selected from the group consisting of nitrogen, Ag, Al, Cr, Mn, Ti, V, Zr, Nb, Mo, Pd, Cu, Au, Ni, Pt, Zn, In, Ga, Al, Si, Se, Bi, W. Ta, Hf. La, Ce, Nd, Sm, Gd, Tb and Dy can be used. In this case, a crystallization speed can be optimized by varying the concentration of Sn.

The first reflective layer 22 optically has a function of increasing the amount of light absorbed by the first recording layer 18. The first reflective layer 22 thermally has a function of enabling heat generated in the first recording layer 18 to radiate rapidly, thereby making it easy for the first recording layer 18 to be changed to an amorphous phase. The reflective layer 22 also has a function of protecting a multi-layer film from a user environment. As a material for the first reflective layer 22, metal with a high heat conductivity such as Al, Au, Ag, and Cu can be used. Furthermore, it also is possible to use an alloy material mainly containing the metal, to which at least one of the other elements is added for the purpose of enhancing moisture resistance or adjusting heat conductivity. More specifically, an alloy such as Al—Cr, Al—Ti, Au—Pd, Au—Cr, Ag—Pd, Ag—Pd—Cu, Ag—Pd—Ti and Cu—Si also can be used. These alloys have high corrosion resistance and a high heat conductivity. Among them, an Ag alloy has a high heat conductivity. An Ag alloy also is likely to be designed optically so as to decrease its light absorptivity. Therefore, in the case of using an Ag alloy, light is more likely to be allocated to transmitted light, compared with the case of using an Au material or an Al material. Considering the balance between the light absorptivity of the first recording layer 18 and the transmittance of the first information layer 13, the thickness of the first reflective layer 22 preferably is 5 nm to 15 nm (more preferably, 8 nm to 12 nm). By prescribing the thickness to be 5 nm or more, a sufficient radiation function can be obtained. Furthermore, by prescribing the thickness to be 15 nm or less, the transmittance of the first information layer 13 can be prevented from being decreased too much.

Next, the second information layer 14 will be described. The fourth and fifth dielectric layers 25 and 29 have a function of protecting the second recording layer 27 from the environment. By selecting a thickness and a refractive index of these dielectric layers, the light absorptivity of the second recording layer 27 can be enhanced, and a change in the amount of reflected light before and after recording can be increased to enlarge a signal amplitude. These dielectric layers can be made of a material described with respect to the first, second and third dielectric layers 16, 20 and 24. These dielectric layers may be made of different materials or the same material.

The fifth interface layer 26 and the sixth interface layer 28 prevents a substance from moving between the fourth dielectric layer 25 and the second recording layer 27 and between the second recording layer 27 and the fifth dielectric layer 29. The seventh interface layer 30 prevents a substance from moving between the fifth dielectric layer 29 and the second reflective layer 31. These interface layers can be made of a material similar to that of the first and second interface layers 17 and 19. The preferable thickness of these interface layers also is similar to that of the first and second interface layers 17 and 19.

Information is recorded, erased and reproduced with respect to the second recording layer 27 with the laser beam 35 transmitted through the first information layer 13. Information recorded on the second recording layer 27 is reproduced with a laser beam reflected from the second information layer 14. Therefore, it is preferable that the reflectivity of the second information layer 14 is high.

The second recording layer 27 is made of a phase-change material that is transformed in phase reversibly between a crystal phase and an amorphous phase by irradiation with a laser beam. More specifically, a material such as Ge—Sb—Te, Ge—Bi—Te, Ge—Sn—Te, In—Sb—Te, Sb—Te, Ge—Te or Ag—In—Sb—Te can be used. Alternatively, a material obtained by adding at least one element selected from the group consisting of Au, Ag, Cu, Al, Ga, Pd, Pt, Ni, Ce, Cr, Bi, Sn, Se, In, La, C, Si, Ti, Mo, W. Ta, Hf, Zr, Nb and V to the above-mentioned materials also can be used. Alternatively, a material obtained by adding nitrogen or oxygen to these materials also can be used.

Furthermore, a material of a Ge—Sn—Sb—Te system similar to that for the first recording layer 18 may be used for the second recording layer 27. In this case, since the second recording layer 27 is thicker than the first recording layer 18, the content of Sn may be smaller than that for the first recording layer 18. In the case of using a material represented by a composition formula: $(Ge—Sn)_A Sb_B Te_{3+A}$, it is preferable that $2 \leq A \leq 10$ and $2 \leq B \leq 4$. Since a laser beam incident upon the second recording layer 27 is weak, the second recording layer 27 preferably is made of a material with a low melting point. In the case of A=15, a melting point is increased to decrease a recording sensitivity. In the case of A=2, a content Y (atomic %) of Sn preferably satisfies $0<Y \leq 5$. Furthermore, in the case of A=10, it is preferable to satisfy $0<Y \leq 15$.

When the second recording layer 27 is too thin, the reflectivity of the second information layer 14 is decreased. In contrast, when the second recording layer 27 is too thick, heat generated in the second recording layer 27 is likely to radiate in an in-plane direction, so that a small recording mark is unlikely to be formed. Thus, the thickness of the second recording layer 27 preferably is 8 nm to 15 nm.

The second reflective layer 31 increases the amount of light absorbed by the second recording layer 27. The second reflective layer 31 also has a function of allowing heat generated in the second recording layer 27 to radiate rapidly and facilitating the change of the second recording layer 27 to an amorphous state. The second reflective layer 31 can be made of a material described with respect to the first reflective layer 22. The thickness of the second reflective layer 31 preferably is 30 nm to 150 nm (more preferably 70 nm to 90 nm). When the second reflective layer 31 is thinner than 30 nm, a heat diffusion function becomes so small that the second recording layer 27 becomes unlikely to be changed to an amorphous state. Furthermore, when the second reflective layer 31 is thicker than 150 nm, a heat diffusion function becomes too large, and the recording sensitivity of the second recording layer 27 is decreased.

The intermediate layer 15 is formed for the purpose of distinguishing the focus position of the first recording from 18 from that of the second recording layer 27. In the intermediate layer 15, grooves for tracking control may be formed. The intermediate layer 15 can be made of light-curable resin or slow-acting resin. A material for the intermediate layer 15 preferably has a small light absorptivity at a wavelength λ of the laser beam 35. The thickness of the intermediate layer 15 is a depth of focus ΔZ or more determined by a numerical aperture NA of an objective lens condensing the laser beam 35 and the wavelength λ (nm) thereof. In the case where the intensity of a condensing point is 80% of that in the absence of aberration, the depth of focus ΔZ can be approximated by an equation $\Delta Z = \lambda / \{2*NA^2\}$. Thus, when λ=400 nm and NA=0.6, ΔZ=0.556 μm. In this case, a range within ±0.6 μm falls in the depth of focus, so that the thickness of the intermediate layer 15 should be 1

μm or more. On the other hand, it is preferable that the thickness of the intermediate layer 15 is prescribed to be 50 μm or less so that the laser beam 35 can be condensed into both the first recording layer 18 and the second recording layer 27.

The information recording medium shown in FIG. 1 is an example. For example, the information recording medium of the present invention includes an information recording medium 10a shown in FIG. 3. In the information recording medium of the present invention, materials of each dielectric layer, each interface layer, and each reflective layer may be the same or different from each other.

Embodiment 2

In Embodiment 2, a method for producing an information recording medium of the present invention will be described. The same components as those described in Embodiment 1 are denoted with the same reference numerals as those therein, and repeated description will be omitted here.

Figure 3:
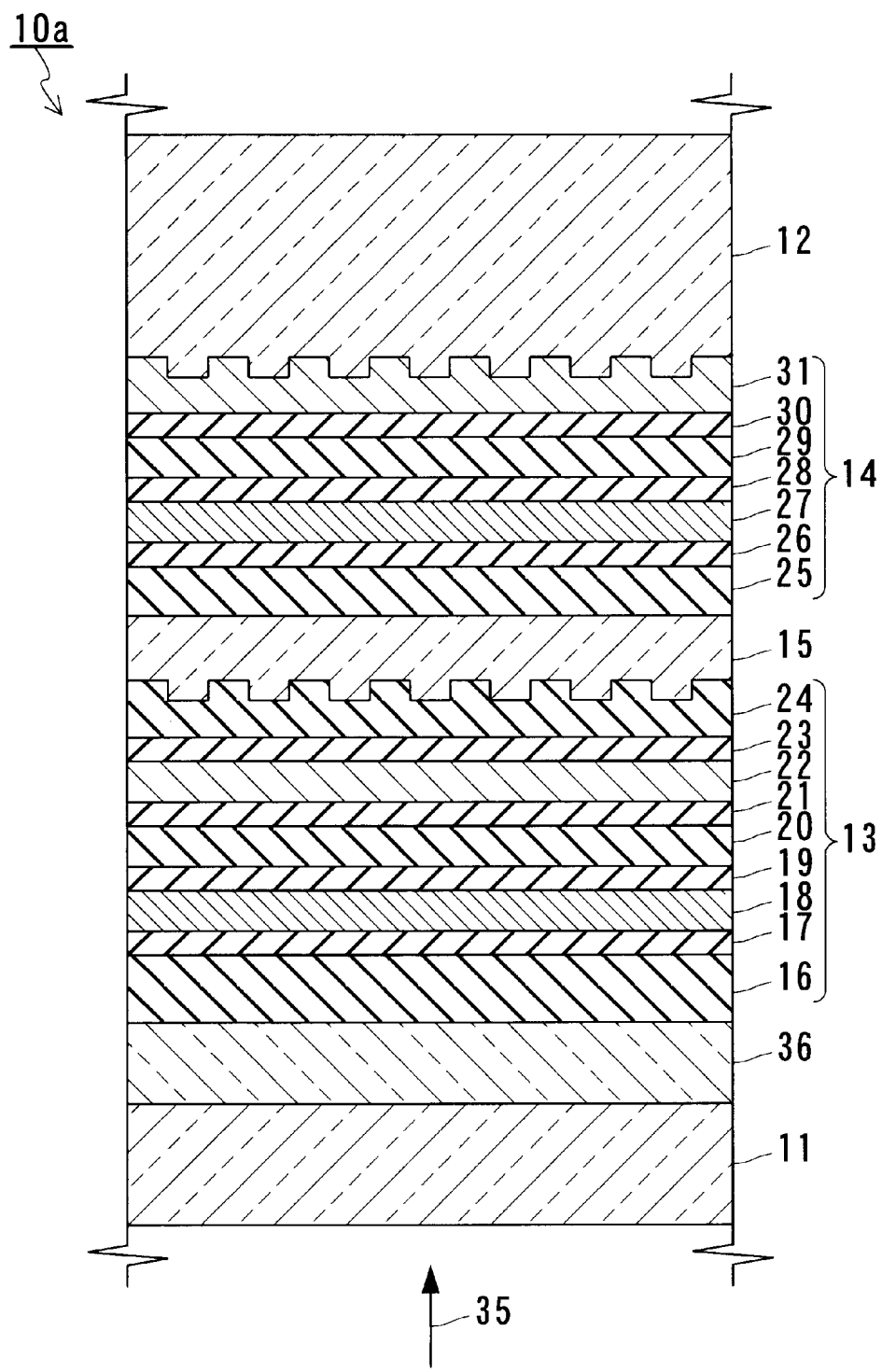
FIG. 3 is a partial cross-sectional view showing another exemplary information recording medium of the present invention.

FIG. 3 is a cross-sectional view of an information recording medium 10a produced by the production method of Embodiment 2. According to this production method, first, a second information layer 14 is formed on a second substrate 12 (Process (a)). Hereinafter, a method for forming the second information layer 14 will be described.

First, the second substrate 12 (e.g., thickness: 1.1 mm) with grooves for tracking control formed thereon is prepared, and this substrate is disposed in a film-formation apparatus. Then, on the side where the grooves of the second substrate 12 are formed, a second reflective layer 31, a seventh interface layer 30, a fifth dielectric layer 29, and a sixth interface layer 28 are formed successively. The second reflective layer 31 can be formed by sputtering in an Ar gas atmosphere, using a base material made of metal. Each interface layer and dielectric layer can be formed by sputtering (e.g., reactive sputtering). As sputtering gas, Ar gas or mixed gas of Ar gas and reactive gas can be used.

Next, a second recording layer 27 is formed. The second recording layer 27 can be formed by sputtering. As a base material, the one (e.g., Ge—Sb—Te alloy) in accordance with the composition of the second recording layer 27 to be formed is used. As sputtering gas, Ar gas, Kr gas, mixed gas of Ar gas and reactive gas (at least one selected from $N_2$ and $O_2$, which similarly is applied below), or mixed gas of Kr gas and reactive gas can be used.

Next, a fifth interface layer 26 and a fourth dielectric layer 25 are formed successively. These layers can be formed by the above-mentioned method. After forming the fourth dielectric layer 25, an initialization process of crystallizing the second recording layer 27 may be conducted if required.

Then, an intermediate layer 15 is formed on the second information layer 14 (Process (b)). As shown in FIG. 3, in the present embodiment, the case will be described in which grooves for tracking control are formed on the surface of the intermediate layer 15 on a first substrate 11 side. First, the fourth dielectric layer 25 is coated with uncured UV-curable resin to be a material for the intermediate layer 15. The UV-curable resin also can be applied, for example, by spin coating. Then, a transparent substrate (e.g., a polycarbonate substrate) on which the shape of grooves for tracking control are transferred is prepared. The surface of the substrate on which the grooves are formed is brought into contact with the resin, and then the resin is irradiated with UV-rays to be cured, whereby the grooves are transferred to the resin. Thereafter, by peeling off the substrate, the intermediate layer 15 with the grooves for tracking control formed thereon can be formed.

Then, a first information layer 13 is formed on the intermediate layer 15 (Process (c)). Hereinafter, a method for forming the first information layer 13 will be described.

First, on the intermediate layer 15, a third dielectric layer 24, a fourth interface layer 23, a first reflective layer 22, a third interface layer 21, a second dielectric layer 20, and a second interface layer 19 are formed successively. These layers can be formed by the method described with respect to the second information layer 14.

Then, a first recording layer 18 is formed on the second interface layer 19. The composition of the first recording layer 18 is the same as that described in Embodiment 1. The first recording layer 18 can be formed to a thickness of 9 nm or less, using a base material containing Ge, Sn, Sb, and Te. More specifically, the first recording layer 18 can be formed by sputtering, using a base material of a Ge—Sn—Sb—Te alloy The first recording layer 18 also can be formed by simultaneous sputtering with four power sources, using four base materials Ge, Sn, Sb, and Te. A base material made of a compound containing at least two of Ge, Sn, Sb, and Te may be used. As sputtering gas, Ar gas, Kr gas, mixed gas of Ar gas and reactive gas, or mixed gas of Kr gas and reactive gas can be used. The first recording layer 18 preferably is formed at a film-formation speed in a range of 0.1 nm/second to 10 nm/second. The film-formation speed can be controlled by a power applied to electrodes. By prescribing the film-formation speed at 0.1 nm/second or more, an excess amount of sputtering gas can be prevented from being mixed in the recording layer. Furthermore, by prescribing a film-formation speed at 10 nm/second or less, the thickness of the recording layer can be controlled more easily.

According to the above-mentioned method, irrespective of the composition and shape of a base material, as long as the composition excluding a reactive gas element with respect to the formed first recording layer 18 is $(Ge—Sn)_A Sb_B Te_{3+A}$, a particularly excellent information recording medium can be obtained.

Next, a first interface layer 17 and a first dielectric layer 16 are formed successively on the first recording layer 18. These layers can be formed by the above-mentioned method. It also may be possible that after the first dielectric layer 16 is formed, an initialization process of irradiating the first recording layer 18 with a laser beam so as to crystallize the entire first recording layer 18 is carried out.

Thereafter, a first substrate 11 is attached to the first information layer 13 (Process (d)). First, the first dielectric layer 16 is coated with uncured resin. As the resin, UV-curable resin or electron-beam curable resin can be used. The resin can be applied by spin coating or the like. This resin is cured to become an adhesive layer 36. The thickness of the adhesive layer 36 preferably is in a range of 5 μm to 40 μm. Thereafter, the first substrate 11 is brought into contact with the uncured resin, and the resin is cured by irradiation with UV-rays or an electron beam. Thus, the first dielectric layer 16 and the first substrate 11 are attached to each other via the adhesive layer 36. As a material for the adhesive layer 36, slow-acting resin may be used. A hard coat layer for preventing scratches may be formed on the first substrate 11. The hard coat layer can be made of, for example, UV-curable resin.

In this manner, the information recording medium described in Embodiment 1 can be produced. The information recording medium described in Embodiment 1 also can be produced by another method. For example, it also may be possible that the first information layer 13 is formed on the first substrate 11, the second information layer 14 is formed on the second substrate 12, and the first and second information layers 13 and 14 are attached to each other via the intermediate layer 15. Each layer can be formed by the above-mentioned method.

Embodiment 3

In Embodiment 3, a method for recording/reproducing information with respect to an information recording medium of the present invention will be described.

Figure 4:
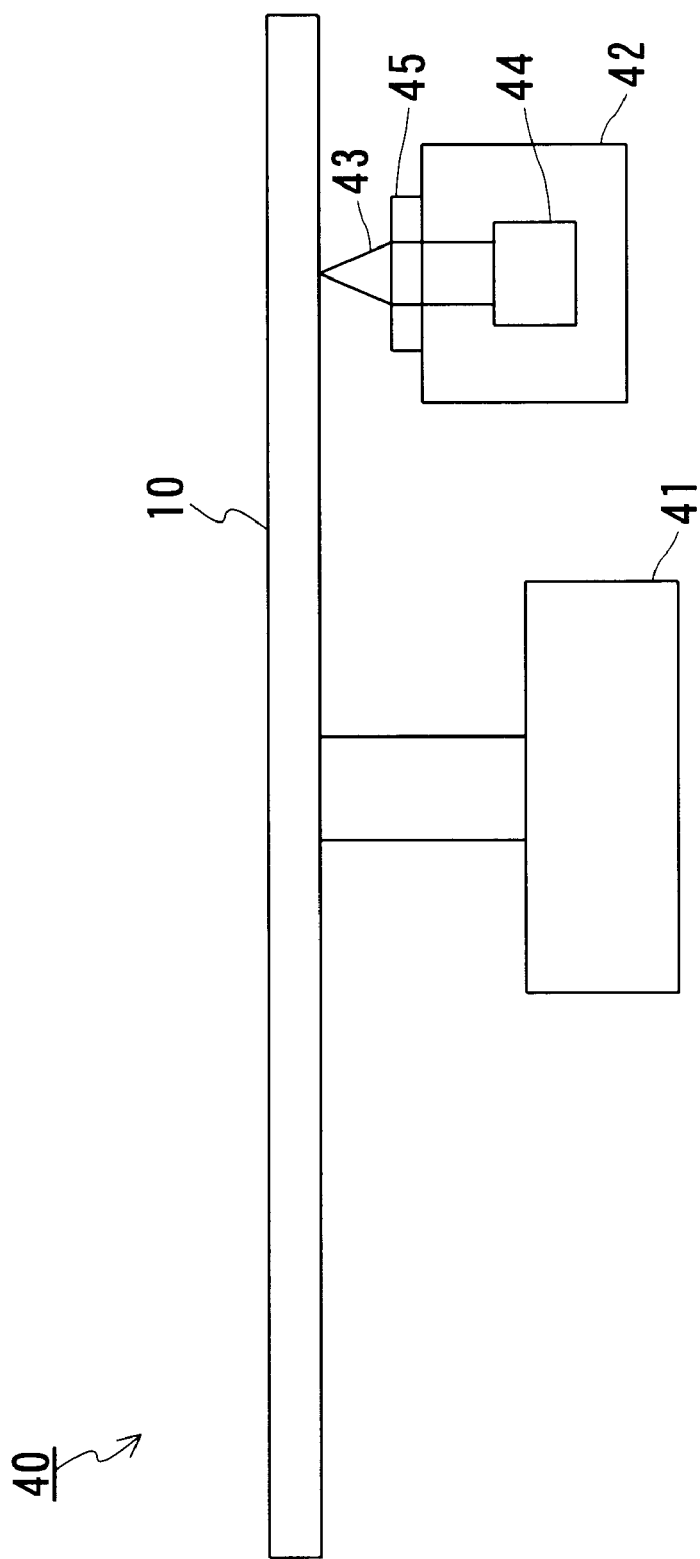
FIG. 4 is a view schematically showing an exemplary structure of a recording/reproducing apparatus used for a recording/reproducing method of the present invention.

FIG. 4 shows an exemplary recording/reproducing apparatus used in the recording/reproducing method of the present invention. Referring to FIG. 4, a recording/reproducing apparatus 40 includes a spindle motor 41 for rotating an information recording medium 10 and an optical head 42. The optical head 42 includes a semiconductor laser 44 for emitting a laser beam 43, an objective lens 45 for condensing the laser beam 43, and a photodiode (not shown) for detecting the laser beam 43 reflected from the information recording medium 10.

The information recording medium 10 is the information recording medium of the present invention described in Embodiment 1. The wavelength of the laser beam 43 is in a range of 390 nm to 430 nm. The objective lens 45 has a numerical aperture in a range of 0.4 to 1.1.

According to the recording/reproducing method of Embodiment 3, it is preferable that information is recorded, reproduced and erased by rotating the information recording medium 10 at a linear velocity in a range of 1 m/second to 50 m/second.

In the case where the information recording medium 10 has grooves for tracking control, information may be recorded only on the grooves 11a or may be recorded only on the lands 11b (see FIG. 1). Information also may be recorded on both the grooves 11a and the lands 11b. For example, in the case where grooves are formed on both the first information layer 13 and the second information layer 14, the recording of information onto the first information layer 13/second information layer 14 may be either groove recording/groove recording, groove recording/land recording, land recording/groove recording, or land recording/land recording.

Information is recorded by modulating the laser beam 43 to be radiated between a higher peak power Pp(mW) and a lower bias power Pb(mW). An amorphous phase is formed by irradiation with a laser beam with Pp to be a recording mark. A crystal phase is formed between the recording marks by irradiation with a laser beam with Pb.

When information is recorded onto/reproduced from the first information layer 13, the laser beam 43 is focused to be radiated onto the first recording layer 18. Information is reproduced by detecting the laser beam 43 reflected from the first recording layer 18. When information is recorded onto/reproduced from the second information layer 14, the laser beam 43 is focused to be radiated onto the second recording layer 27. Information is reproduced by detecting the laser beam 43 reflected from the second recording layer 27 and transmitted through the intermediate layer 15 and the first information layer 13.

EXAMPLES

Hereinafter, the present invention will be described by way of illustrative examples with reference to the drawings.

Example 1

Figure 5:
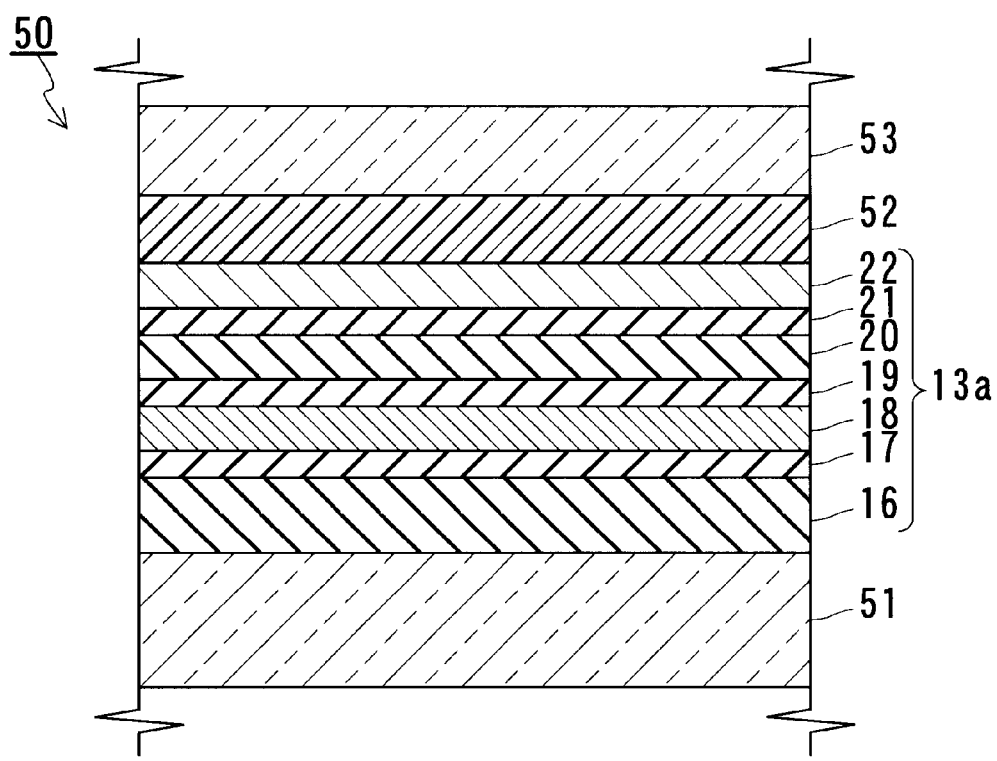
FIG. 5 is a partial cross-sectional view showing a structure of a sample used for evaluating the information recording medium of the present invention.

In Example 1, the relationship between a material and characteristics of a recording layer was evaluated. First, a sample 50 shown in FIG. 5 was produced. The sample 50 in FIG. 5 includes a first information layer 13a formed on a first substrate 51. The first information layer 13a is attached to a dummy substrate 53 via an adhesive layer 52. Hereinafter, a method for producing the sample 50 will be described.

First, as the substrate 51, a polycarbonate substrate of 12 mm×18 mm (thickness: 0.6 mm) was prepared. On the substrate 51, a first dielectric layer 16 (thickness: 90 nm), a first interface layer 17 (thickness: 3 nm), a first recording layer 18, a second interface layer 19 (thickness: 3 nm), a second dielectric layer 20 (thickness: 36 nm), a third interface layer 21 (thickness: 3 nm), and a first reflective layer 22 (thickness: 10 nm) were formed successively by sputtering.

In Example 1, ZnS—SiO$_2$ (SiO$_2$: 20 mol %) was used for each dielectric layer, Ge—N was used for each interface layer, and an Ag alloy was used for the first reflective layer 22. Furthermore, the first recording layer 18 was made of a material represented by a composition formula: (Ge—Sn)$_4$Sb$_2$Te$_7$ (the total content of Ge and Sn is 30.8 atomic %). The first recording layer 18 was not initialized and retained in an amorphous state. In Example 1, a plurality of samples were produced by varying a content X (atomic %) of Ge and a content Y (atomic %) of Sn in the first recording layer 18.

The thickness of the first recording layer 18 was varied in a range of 3 nm to 12 nm. The thickness of the first and second dielectric layers 16 and 20 was determined by calculation based on the matrix method so that a change in reflectivity of the first recording layer 18 at a wavelength of 405 nm became large, and the amount of light incident upon the first recording layer 18 became large.

Each dielectric layer was formed by high-frequency sputtering (power: 400 W) in an Ar atmosphere, using a base material of ZnS—SiO$_2$ (diameter: 100 mm, thickness: 6 mm). Each interface layer was formed by high-frequency sputtering (power: 300 W) in an atmosphere of mixed gas of Ar gas and nitrogen gas, using a base material of Ge (diameter: 100 nm, thickness: 6 mm). The first recording layer 18 was formed by direct-current sputtering (power: 50 W) in an Ar gas atmosphere, using a base material of a Ge—Sn—Sb—Te alloy (diameter: 100 mm, thickness: 6 mm). The film-formation speed of the first recording layer 18 was 0.5 nm/second. The first reflective layer 22 was formed by direct-current sputtering (power: 200 W), using a base material of a silver alloy (diameter: 100 mm, thickness: 6 mm).

Next, the first reflective layer 22 was coated with UV-curable resin to be the adhesive layer 52. The dummy substrate 53 was brought into contact with the resin, and the resin was cured to attach the first reflective layer 22 to the dummy substrate 53 via the adhesive layer 52. Initialization was not conducted, and the first recording layer 18 was retained in an amorphous phase (as-depo amorphous phase) after film-formation. Thus, a plurality of samples 50 were produced.

Figure 6:
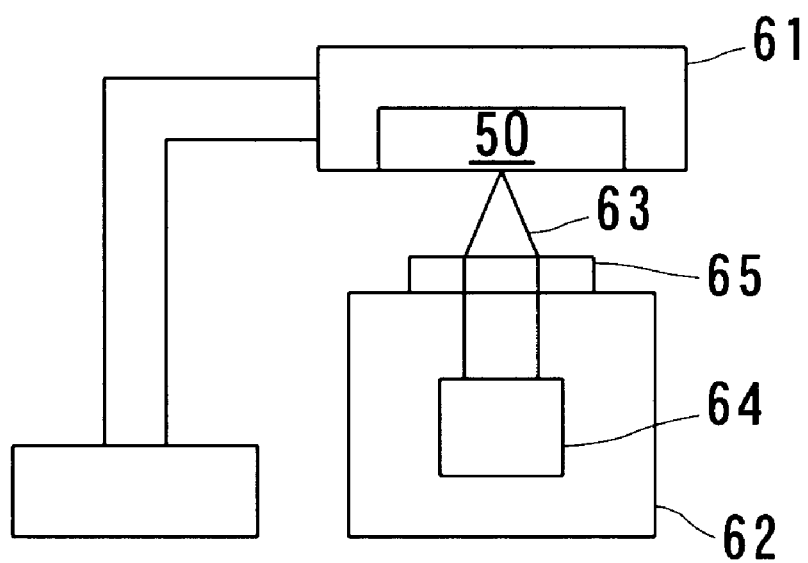
FIG. 6 is a diagram schematically showing a structure of an evaluation apparatus used for evaluating the information recording medium of the present invention.

The samples thus produced were evaluated by using an evaluation apparatus shown in FIG. 6. The evaluation apparatus in FIG. 6 is provided with a stage 61 and an optical head 62. The optical head 62 includes a semiconductor layer 64 for emitting a laser beam 63 with a wavelength of 405 nm and an objective lens 65 with a numerical aperture of 0.65.

Next, a method for evaluating the samples will be described. First, the sample 50 was fixed on the stage 61. The sample 50 was irradiated with a pulse laser of 500 ns at 3.5 mW, whereby the first recording layer 18 was changed from an as-depo amorphous phase to a crystal phase. Then, the sample 50 was irradiated with a pulse laser of 40 ns at 7 mW, whereby the first recording layer 18 was once melted to be changed from a crystal phase to an amorphous phase. Thereafter, a pulse laser of 3 mW was radiated for an irradiation time in a range of 10 ns to 500 ns, and a time required for changing an amorphous phase to a crystal phase was measured. Whether or not a phase change occurred was determined by a reflectivity. Table 1 shows the measurement results.

TABLE 1

| Sample No. | Ge amount (atomic %) | Sn amount (atomic %) | Thickness of a recording layer (nm) | Crystallization time (ns) |
|---|---|---|---|---|
| 1-1 | 30.8 | 0 | 3 | 500< |
| 1-2 | | | 4 | 500 |
| 1-3 | | | 5 | 200 |
| 1-4 | | | 6 | 90 |
| 1-5 | | | 7 | 65 |
| 1-6 | | | 8 | 50 |
| 1-7 | | | 9 | 40 |
| 1-8 | | | 10 | 30 |
| 1-9 | | | 11 | 30 |
| 1-10 | | | 12 | 30 |
| 1-11 | 25.8 | 5 | 3 | 500< |
| 1-12 | | | 4 | 400 |
| 1-13 | | | 5 | 150 |
| 1-14 | | | 6 | 70 |
| 1-15 | | | 7 | 50 |
| 1-16 | | | 8 | 30 |
| 1-17 | | | 9 | 30 |
| 1-18 | | | 10 | 30 |
| 1-19 | | | 11 | 30 |
| 1-20 | | | 12 | 30 |
| 1-21 | 20.8 | 10 | 3 | 400 |
| 1-22 | | | 4 | 200 |
| 1-23 | | | 5 | 80 |
| 1-24 | | | 6 | 50 |
| 1-25 | | | 7 | 40 |
| 1-26 | | | 8 | 30 |
| 1-27 | | | 9 | 20 |
| 1-28 | | | 10 | 20 |
| 1-29 | | | 11 | 20 |
| 1-30 | | | 12 | 20 |
| 1-31 | 15.8 | 15 | 3 | 300 |
| 1-32 | | | 4 | 100 |
| 1-33 | | | 5 | 60 |
| 1-34 | | | 6 | 20 |
| 1-35 | | | 7 | 20 |
| 1-36 | | | 8 | 20 |
| 1-37 | | | 9 | 20 |
| 1-38 | | | 10 | 20 |
| 1-39 | | | 11 | 20 |
| 1-40 | | | 12 | 20 |
| 1-41 | 10.8 | 20 | 3 | 200 |
| 1-42 | | | 4 | 60 |
| 1-43 | | | 5 | 30 |
| 1-44 | | | 6 | 15 |
| 1-45 | | | 7 | 15 |
| 1-46 | | | 8 | 15 |
| 1-47 | | | 9 | 15 |
| 1-48 | | | 10 | 15 |
| 1-49 | | | 11 | 15 |
| 1-50 | | | 12 | 15 |

In Table 1, the crystallization time refers to an irradiation time of a laser required for changing an amorphous phase to a crystal phase. As the crystallization time becomes shorter, the crystallization speed of the first recording layer 18 becomes faster.

As shown in Table 1, there was a tendency that as the concentration of Sn is increased, the crystallization time is shortened. Furthermore, as the recording layer became thinner, this tendency was increased. In this manner, even in the case where the recording layer was thin, by adding Sn to Ge—Sb—Te, the crystallization time was shortened.

Example 2

In Example 2, the first information layer 13 shown in FIG. 1 was produced, and its transmittance was measured.

First, as the first substrate 11, a polycarbonate substrate with a diameter of 120 mm and a thickness of 0.1 mm was prepared. On this substrate, the first dielectric layer 16 (thickness: 110 nm), the first interface layer 17 (thickness: 3 nm), the first recording layer 18, the second interface layer (thickness: 3 nm), the second dielectric layer 20 (thickness: 22 nm), the third interface layer 21 (thickness: 3 nm), the first reflective layer 22 (thickness: 10 nm), the fourth interface layer 23 (thickness: 3 nm), and the third dielectric layer 24 (thickness: 17 nm) were formed successively by sputtering. The thickness of the first recording layer 18 was varied in a range of 3 nm to 12 nm. The thickness of the first and second dielectric layers 16 and 20 was determined by calculation based on the matrix method so that a change in reflectivity of the first recording layer 18 at a wavelength of 405 nm became large, and the light absorptivity of the first recording layer 18 became large. Furthermore, the thickness of the third dielectric layer 24 was determined so that the transmittance of the first information layer 13 became high without influencing recording/reproducing characteristics of the first information layer 13.

Ge—N was used for each interface layer in the same way as in Example 1. ZnS—$SiO_2$ ($SiO_2$: 20 mol %) was used for each dielectric layer in the same way as in Example 1. A material represented by a composition formula: (Ge—Sn)$_4$$Sb_2$$Te_7$ (Ge: 20.8 atomic %, Sn: 10 atomic %) was used for the first recording layer 18.

The first information layer 13 thus obtained was attached to a dummy substrate using UV-curable resin. Thus, samples for measuring a transmittance were obtained.

These samples were measured for a transmittance Ta when the first recording layer 18 was in an amorphous phase. Thereafter, the first recording layer 18 was crystallized, and a transmittance Tc was measured. The transmittance was measured by obtaining a value at a wavelength of 405 nm using a spectroscope. Table 2 shows the measurement results.

TABLE 2

| Sample No. | Ge amount (atomic %) | Sn amount (atomic %) | Thickness of a recording layer (nm) | Ta (%) | Tc (%) | (Tc + Ta)/2 (%) |
|---|---|---|---|---|---|---|
| 2-1 | 20.8 | 10 | 3 | 58 | 64 | 61 |
| 2-2 | | | 4 | 54 | 60 | 57 |
| 2-3 | | | 5 | 50 | 56 | 53 |
| 2-4 | | | 6 | 47 | 53 | 50 |
| 2-5 | | | 7 | 44 | 50 | 47 |
| 2-6 | | | 8 | 40 | 46 | 43 |
| 2-7 | | | 9 | 37 | 43 | 40 |
| 2-8 | | | 10 | 34 | 40 | 37 |
| 2-9 | | | 11 | 31 | 37 | 34 |
| 2-10 | | | 12 | 27 | 33 | 30 |

In order to allow a sufficient amount of laser beam to be incident upon the second information layer 14, it is preferable that a transmittance of the first information layer 13 satisfies 40≦(Tc+Ta)/2. As is apparent from Table 2, by prescribing the thickness of the first recording layer 18 to be 9 nm or less, this condition can be satisfied. By prescribing the thickness of the first recording layer 18 to be 6 nm or less, 50≦(Tc+Ta)/2 can be satisfied. Thus, it is preferable that the thickness of the first recording layer 18 is 9 nm or less.

Example 3

In Example 3, the information recording medium 10 shown in FIG. 1 was produced, and the relationship between a composition and a thickness, and characteristics of the first recording layer 18 was investigated.

First, as the first substrate 11, a polycarbonate substrate with a diameter of 120 mm and a thickness of 0.1 mm was prepared. On this substrate, the first dielectric layer 16 (thickness: 45 nm), the first interface layer 17 (thickness: 3 nm), the first recording layer 18, the second interface layer 19 (thickness: 3 nm), the second dielectric layer 20 (thickness: 11 nm), the third interface layer 21 (thickness: 3 nm), the first reflective layer 22 (thickness: 10 nm), the fourth interface layer 23 (thickness: 3 nm) and the third dielectric layer 24 (thickness: 23 nm) were formed successively by sputtering. The thickness of the first recording layer 18 was varied in a range of 3 nm to 9 nm.

The interface layers and the dielectric layers respectively were made of the same materials as those of the samples in Example 2. A material represented by a composition formula: $(Ge-Sn)_4Sb_2Te_7$ was used for the first recording layer 18, and the content of Sn was varied in a range of 0 atomic % to 20 atomic %. Each layer was produced by the same method as that in Example 1.

Next, as the second substrate 12, a polycarbonate substrate with a diameter of 120 mm and a thickness of 1.1 mm was prepared. On this substrate, the second reflective layer 31 (thickness: 80 nm), the seventh interface layer 30 (thickness: 3 nm), the fifth dielectric layer 29 (thickness: 11 nm), the sixth interface layer 28 (thickness: 3 nm), the second recording layer 27 (thickness: 12 nm), the fifth interface layer 26 (thickness: 3 nm) and the fourth dielectric layer 25 (thickness: 65 nm) were formed by sputtering. The thickness of each dielectric layer was determined by calculation based on the matrix method so that recording/reproducing characteristics of the second recording layer 27 became satisfactory.

An Ag alloy was used for the second reflective layer 31. Ge—N was used for each interface layer. $ZnS-SiO_2$ ($SiO_2$: 20 mol %) was used for each dielectric layer. A material represented by a composition formula: $Ge_4Sb_2Te_7$ was used for the second recording layer 27. Each dielectric layer, interface layer, and reflective layer were formed by the method described in Example 1. The second recording layer 27 was formed by direct-current sputtering (power: 100 W) in an atmosphere of mixed gas of Ar gas and $N_2$ gas, using a base material of a Ge—Sb—Te alloy.

Next, the first recording layer 18 and the second recording layer 27 were initialized (i.e., crystallized). Thereafter, the first information layer 13 and the second information layer 14 were attached to each other via UV-curable resin. Thus, a plurality of samples including the first recording layers 18 with different compositions and thicknesses were produced.

The samples thus obtained were measured for an erasure ratio of a recording mark and a carrier to noise ratio (CNR). The recording/reproducing apparatus shown in FIG. 4 was used for this measurement. More specifically, a laser beam with a wavelength of 405 nm, and an objective lens with a numerical aperture of 0.85 were used. The linear velocity of the information recording medium 10 during measurement of an erasure ratio and a CNR was set at 8.6 m/s. A signal was recorded on land portions (see, lands 11b in FIG. 1). Table 3 shows the measurement results.

TABLE 3

| Sample No. | Ge amount (atomic %) | Sn amount (atomic %) | Thickness of a recording layer (nm) | Erasure ratio (dB) | CNR (dB) |
|---|---|---|---|---|---|
| 3-1 | 30.8 | 0 | 3 | 0 | 20 |
| 3-2 | | | 4 | 0 | 30 |
| 3-3 | | | 5 | 5 | 37 |
| 3-4 | | | 6 | 10 | 44 |
| 3-5 | | | 7 | 15 | 46 |
| 3-6 | | | 8 | 20 | 46 |
| 3-7 | | | 9 | 25 | 46 |
| 3-8 | 25.8 | 5 | 3 | 0 | 25 |
| 3-9 | | | 4 | 5 | 35 |
| 3-10 | | | 5 | 10 | 40 |
| 3-11 | | | 6 | 15 | 46 |
| 3-12 | | | 7 | 20 | 50 |
| 3-13 | | | 8 | 25 | 50 |
| 3-14 | | | 9 | 30 | 50 |
| 3-15 | 20.8 | 10 | 3 | 20 | 40 |
| 3-16 | | | 4 | 25 | 47 |
| 3-17 | | | 5 | 30 | 52 |
| 3-18 | | | 6 | 34 | 52 |
| 3-19 | | | 7 | 34 | 52 |
| 3-20 | | | 8 | 35 | 52 |
| 3-21 | | | 9 | 35 | 52 |
| 3-22 | 15.8 | 15 | 3 | 23 | 43 |
| 3-23 | | | 4 | 25 | 48 |
| 3-24 | | | 5 | 30 | 52 |
| 3-25 | | | 6 | 36 | 52 |
| 3-26 | | | 7 | 36 | 52 |
| 3-27 | | | 8 | 36 | 52 |
| 3-28 | | | 9 | 36 | 52 |
| 3-29 | 10.8 | 20 | 3 | 25 | 37 |
| 3-30 | | | 4 | 30 | 43 |
| 3-31 | | | 5 | 35 | 48 |
| 3-32 | | | 6 | 38 | 45 |
| 3-33 | | | 7 | 38 | 45 |
| 3-34 | | | 8 | 38 | 45 |
| 3-35 | | | 9 | 38 | 45 |

In the information recording medium, an erasure ratio preferably is 20 dB or more, more preferably 30 dB or more. Furthermore, a CNR preferably is 40 dB or more, more preferably 50 dB or more.

As shown in Table 3, in samples 3-1 to 3-7 with no Sn added thereto, an erasure ratio and a CNR were low. In particular, in the case where the thickness of the first recording layer 18 was 6 nm or less, an erasure ratio was 10 dB or less. The addition of Sn enhanced an erasure ratio, and in a sample 3-18 using the first recording layer 18 with a thickness of 6 nm and containing 10 atomic % of Sn, satisfactory results (i.e., an erasure ratio of 34 dB and a CNR of 52 dB) were obtained.

According to the results in Example 3, when a content X (atomic %) of Ge and a content Y (atomic %) of Sn satisfied about $X/5 \leq Y \leq$ about $2X$, satisfactory recording/erasing characteristics were obtained. In particular, in the case where about $X/2 \leq Y \leq$ about X was satisfied, an erasure ratio and a CNR both exhibited excellent characteristics.

The results in Example 3 are those in the case where the linear velocity of the information recording medium is 8.6 m/s, and when the linear velocity is decreased, an erasure ratio and a CNR are increased.

When the information recording medium 10a was produced by the production method of Embodiment 2, and the present example was carried out, the same results were obtained (this applies to Examples 5, 6, 7, 8, 10, and 11.)

Example 4

In Example 4, the same samples as those in Example 1 were produced, except that the first recording layer 18 was different, and the same evaluation as that in Example 1 was conducted.

In Example 4, the thickness of the first recording layer 18 was prescribed to be 6 nm, and a material represented by a composition formula: $(Ge\text{—}Sn)_A Sb_2 Te_{3+A}$ was used. A plurality of samples with the value of A varied were produced, and evaluated for the relationship between a composition and a crystallization time. A content Y (atomic %) of Sn was set to be about a half of a content X (atomic %) of Ge. Table 4 shows the measurement results of a crystallization time.

TABLE 4

| Sample No. | Ge + Sn amount (atomic %) | Sn amount (atomic %) | A | Crystallization time (ns) |
| --- | --- | --- | --- | --- |
| 4-1 | 14.3 | 5 | 1 | 10 |
| 4-2 | 22.2 | 7 | 2 | 30 |
| 4-3 | 30.8 | 10 | 4 | 50 |
| 4-4 | 35.3 | 12 | 6 | 60 |
| 4-5 | 38.1 | 13 | 8 | 70 |
| 4-6 | 40.0 | 13 | 10 | 80 |
| 4-7 | 42.4 | 14 | 14 | 90 |
| 4-8 | 44.9 | 15 | 22 | 100 |
| 4-9 | 47.3 | 16 | 44 | 110 |

As is apparent from Table 4, there is a tendency that when the value of A is increased, the crystallization time is prolonged.

Example 5

In Example 5, the same samples as those in Example 3 were produced, except that the first recording layer 18 was different, and a CNR and an erasure ratio were measured by the same method as that in Example 3. The thickness of the first recording layer 18 was prescribed to be 6 nm, and was made of a material represented by a composition formula: $(Ge\text{—}Sn)_A Sb_2 Te_{3+A}$. A plurality of samples with the value of A varied were produced. A content Y (atomic %) of Sn was prescribed to be about a half of a content X (atomic %) of Ge. Table 5 shows the measurement results.

TABLE 5

| Sample No. | Ge + Sn amount (atomic %) | Sn amount (atomic %) | A | Erasure ratio (dB) | CNR (dB) |
| --- | --- | --- | --- | --- | --- |
| 5-1 | 14.3 | 5 | 1 | 30 | 35 |
| 5-2 | 22.2 | 7 | 2 | 34 | 40 |
| 5-3 (3-18) | 30.8 | 10 | 4 | 34 | 52 |
| 5-4 | 35.3 | 12 | 6 | 32 | 53 |
| 5-5 | 38.1 | 13 | 8 | 30 | 54 |
| 5-6 | 40.0 | 13 | 10 | 22 | 55 |
| 5-7 | 42.4 | 14 | 14 | 16 | 55 |
| 5-8 | 44.9 | 15 | 22 | 14 | 56 |
| 5-9 | 47.3 | 16 | 44 | 10 | 57 |

As is apparent from Table 5, there is a tendency that when the value of A is small, a CNR is decreased, and when the value of A is large, an erasure ratio is decreased. This tendency corresponds to the results in Example 4. In the case of using the recording layer in Example 5, it is preferable that A satisfies $2 \leq A \leq 10$.

Example 6

In Example 6, the same samples as those in Example 3 were produced, except that the first recording layer 18 was different, and a CNR and an erasure ratio were measured by the same method as that in Example 3. The thickness of the first recording layer 18 was prescribed to be 6 nm, and was made of a material represented by a composition formula: $(Ge\text{—}Sn)_A Sb_2 Te_{3+A}$. A plurality of samples with the value of A varied were produced. Unlike Example 5, a content Y (atomic %) of Sn was prescribed to be substantially the same as a content X (atomic %) of Ge. Table 6 shows the measurement results.

TABLE 6

| Sample No. | Ge + Sn amount (atomic %) | Sn amount (atomic %) | A | Erasure ratio (dB) | CNR (dB) |
| --- | --- | --- | --- | --- | --- |
| 6-1 | 14.3 | 7 | 1 | 30 | 37 |
| 6-2 | 22.2 | 11 | 2 | 34 | 42 |
| 6-3 (3-25) | 30.8 | 15 | 4 | 36 | 52 |
| 6-4 | 35.3 | 17 | 6 | 36 | 53 |
| 6-5 | 38.1 | 19 | 8 | 34 | 54 |
| 6-6 | 40.0 | 20 | 10 | 30 | 54 |
| 6-7 | 42.4 | 21 | 14 | 26 | 54 |
| 6-8 | 44.9 | 22 | 22 | 20 | 53 |
| 6-9 | 47.3 | 23 | 44 | 16 | 53 |

As is apparent from Table 6, in the case of using the recording layer in Example 6, it is preferable that A satisfies $2 \leq A \leq 22$.

Example 7

In Example 7, the same samples as those in Example 3 were produced, except that the first recording layer 18 was different. The thickness of the first recording layer 18 was prescribed to be 6 nm, and was made of a material represented by a composition formula: $(Ge\text{—}Sn)_{22} Sb_B Te_{25}$. A plurality of samples with the value of B varied were produced.

These samples were evaluated for cycle life number of times (hereinafter, which may be referred to as "recording cycle performance"), and a recording storage property, using the apparatus in FIG. 4 or 6. The cycle life number of times was determined by repeatedly recording a 3T signal and a random signal, and counting the number of times of recording until the 3T signal was decreased by 3 dB. The recording storage property was evaluated by leaving the sample on which a 3T signal was recorded in an atmosphere of 90° C. and relative humidity of 20% for 100 hours, and measuring a decrease in amplitude of the 3T signal. Table 7 shows the evaluation results.

TABLE 7

| Sample No. | Sn amount (atomic %) | B | Cycle performance | Recording storage property |
| --- | --- | --- | --- | --- |
| 7-1 | 10 | 2.0 | C1 | B2 |
| 7-2 |  | 2.5 | B1 | A2 |
| 7-3 |  | 3.0 | B1 | A2 |
| 7-4 |  | 3.5 | D1 | E2 |
| 7-5 |  | 4.0 | D1 | E2 |
| 7-6 |  | 4.5 | D1 | E2 |
| 7-7 |  | 5.0 | D1 | E2 |
| 7-8 | 15 | 2.0 | C1 | B2 |
| 7-9 |  | 2.5 | B1 | B2 |
| 7-10 |  | 3.0 | B1 | A2 |
| 7-11 |  | 3.5 | A1 | A2 |
| 7-12 |  | 4.0 | D1 | E2 |
| 7-13 |  | 4.5 | D1 | E2 |
| 7-14 |  | 5.0 | D1 | E2 |
| 7-15 | 20 | 2.0 | C1 | C2 |
| 7-16 |  | 2.5 | B1 | B2 |
| 7-17 |  | 3.0 | B1 | B2 |
| 7-18 |  | 3.5 | A1 | A2 |
| 7-19 |  | 4.0 | A1 | A2 |

TABLE 7-continued

| Sample No. | Sn amount (atomic %) | B | Cycle performance | Recording storage property |
|---|---|---|---|---|
| 7-20 | | 4.5 | D1 | E2 |
| 7-21 | | 5.0 | D1 | E2 |
| 7-22 | 25 | 2.0 | C1 | C2 |
| 7-23 | | 2.5 | B1 | C2 |
| 7-24 | | 3.0 | B1 | B2 |
| 7-25 | | 3.5 | A1 | A2 |
| 7-26 | | 4.0 | A1 | A2 |
| 7-27 | | 4.5 | D1 | E2 |
| 7-28 | | 5.0 | D1 | E2 |
| 7-29 | 30 | 2.0 | D1 | D2 |
| 7-30 | | 2.5 | D1 | D2 |
| 7-31 | | 3.0 | D1 | D2 |
| 7-32 | | 3.5 | D1 | D2 |
| 7-33 | | 4.0 | D1 | D2 |
| 7-34 | | 4.5 | D1 | D2 |
| 7-35 | | 5.0 | D1 | D2 |

In Table 7, A1 to D1 represent cycle life number of times. More specifically, $D1<1000$, $1000 \leq C1 \leq 5000$, $5000 \leq B1 < 10000$, and $10000 \leq A1$. A2 to E2 represent a decrease amount of an amplitude of a 3T signal. More specifically, $3\,dB \leq D2$, $1\,dB \leq C2 < 3\,dB$, $0\,dB < B2 < 1\,dB$, and $A2=0\,dB$. Furthermore, E2 shows that a crystallization speed was slow, and an erasure ratio was less than 10 dB.

As shown in Table 7, when the concentration of Sb in the recording layer was higher, cycle performance was enhanced. Furthermore, by increasing the concentrations of Sb and Sn, a composition range in which both the cycle performance and the recording storage property became satisfactory was enlarged. Thus, in the case of using the recording layer (A=22) in Example 7, it is preferable that a content Y (atomic %) of Sn and B satisfy $0 < Y \leq 25$ and $2 \leq B \leq 4$, respectively.

Example 8

In Example 8, the samples were produced in which only the composition of the first recording layer 18 was different from that in Example 7, and the same measurement as that in Example 7 was conducted. More specifically, the first recording layer 18 was made of a material represented by a composition formula: $(Ge-Sn)_2Sb_BTe_5$. As a result, in the case of using the recording layer (A=2) in Example 8, it is preferable that B and Y satisfy $2 \leq B \leq 4$ and $0 < Y \leq 15$, respectively.

Example 9

In Example 9, the same samples as those in Example 2 were produced, except that the first recording layer 18 and the first reflective layer 22 were different. More specifically, the first recording layer 18 was made of a material represented by a composition formula: $(Ge-Sn)_4Sb_2Te_7$, and the thickness thereof was varied in a range of 1 nm to 9 nm. An Ag alloy was used for the first reflective layer 22, and the thickness was set to be 3, 5, 7, 10, 12, 15, 17 and 20 nm.

A plurality of samples thus produced were measured for a reflectivity, a transmittance, and an amplitude of a 3T signal. As a result, it was found that the thickness of the first reflective layer preferably is in a range of 5 nm to 15 nm, and more preferably is in a range of 8 nm to 12 nm. In the absence of the first reflective layer 22, the reflectivity of the first information layer 13 was decreased. Furthermore, when the first reflective layer 22 was thin (i.e., 5 nm), a heat diffusion function thereof was decreased, and an amplitude of a 3T signal became small. When the first reflective layer 22 was thicker than 15 nm, the transmittance of the first information layer 13 was decreased.

Example 10

In Example 10, samples were produced in the same way as in Example 3, except that the first recording layer 18 and the recording position of an information signal were changed. More specifically, the thickness of the first recording layer 18 was prescribed to be 6 nm, and was made of a material represented by a composition formula: $(Ge-Sn)_4Sb_2Te_7$ (where Sn: 10 atomic %). Information was recorded on either grooves (groove surface closer to an incident side of a laser beam) formed for the purpose of tracking control or lands (groove surface far away from an incident side of a laser beam).

The transmittance of the first information layer 13 of these samples was 50% on average. These samples were measured for an erasure ratio and a CNR by the same method as that in Example 3. In Example 10, a power Pp of a laser beam for forming a recording mark (amorphous phase) and a power Pb of a laser beam for forming a crystal phase were varied. Table 8 shows the measurement results.

TABLE 8

| First information layer 13 | | | | Second information layer 14 | | | |
|---|---|---|---|---|---|---|---|
| Recording position | CNR (dB) | Erasure ratio (dB) | Pp/Pb (mW) | Recording position | CNR (dB) | Erasure ratio (dB) | Pp/Pb (mW) |
| Groove | 52 | 33 | 7.0/3.0 | Groove | 53 | 35 | 9.6/3.6 |
| | | | | Land | 53 | 34 | 10.0/4.0 |
| Land | 52 | 34 | 7.5/3.5 | Groove | 53 | 34 | 9.5/3.5 |
| | | | | Land | 53 | 33 | 9.9/3.9 |

As is apparent from Table 8, irrespective of whether the recording position of the first recording layer 13 is groove portions or land portions, and whether the recording position of the second information layer 14 is groove portions or land portions, satisfactory results (i.e., $30\,dB \leq$ (erasure ratio) and $50\,dB \leq CNR$) were obtained. More specifically, irrespective of the recording position of a signal, the characteristics of the first information layer 13 and the second information layer 14 were both satisfactory.

Example 11

In Example 11, samples were produced in the same way as in the sample 3-18 in Example 3, except that the method for forming the first recording layer 18 and the second recording layer 27 was different. More specifically, the first recording layer 18 and the second recording layer 27 were formed by direct-current sputtering in an atmosphere of krypton gas. A signal was recorded on land portions (see lands 11b in FIG. 1) in the samples thus obtained, and the recording cycle performance thereof was evaluated. The recording cycle performance was evaluated by measuring a CNR of a 3T signal, and the number of times of recording up to when an initial CNR value was decreased by 3 dB was defined as recording cycle life. Table 9 shows evaluation results.

TABLE 9

| Sample No. | Sputtering gas | Cycle number of times | |
|---|---|---|---|
| | | First information layer 13 | Second information layer 14 |
| 9-1 | krypton | 150,000 | 200,000 |
| 3-18 | argon | 100,000 | 150,000 |

As is apparent from Table 9, compared with a sample 3-18 in which the recording layer was formed in an atmosphere of Ar gas, the cycle performance of a sample 9-1 in which the recording layer was formed in an atmosphere of Kr gas was enhanced by about 1.5 times.

Example 12

In Example 12, the influence of addition of Sb and Sn on a crystallization temperature and a crystallization time was investigated. A $(Ge—Sn)_4Sb_BTe_7$ layer was formed to a thickness of 6 nm on a quartz substrate as the first recording layer 18 for measuring a crystallization temperature, and a Ge—N layer was formed thereon to a thickness of 5 nm. "A" was kept constant at 4, and five kinds of samples with values of B and Y varied were produced. These samples were measured for a crystallization temperature. The crystallization temperature was defined as a temperature at which a transmittance was decreased rapidly due to crystallization. A change in transmittance was measured while increasing the temperature of the samples with a laser beam. A crystallization time was measured by using the sample 50 in FIG. 5 and the evaluation apparatus in FIG. 6. At this time, five kinds of samples were measured, each including the first recording layer 18 with the same composition as that of the samples for measurement of a crystallization temperature. The thickness of the first recording layer 18 was set to be 6 nm. Table 10 shows the measurement results.

TABLE 10

| Sample No. | B | Sn amount (atomic %) | Crystallization time (ns) | Sample No. | Crystallization temperature (° C.) |
|---|---|---|---|---|---|
| 1-4 | 2 | 0 | 90 | 10-3 | 200 |
| 1-24 | 2 | 10 | 50 | 10-4 | 180 |
| 10-1 | 3 | 10 | 55 | 10-5 | 195 |
| 1-34 | 2 | 15 | 20 | 10-6 | 170 |
| 10-2 | 3 | 15 | 22 | 10-7 | 185 |

As is apparent from comparing samples 1-4, 1-24, and 1-34, when only Sn was added at B=2, a crystallization time was shortened (90 ns→50 ns→20 ns), and along with this, a crystallization temperature also was decreased by 30° C. (200° C.→180° C.→170° C.). The decrease in crystallization temperature impairs the thermal stability of a recording mark. In contrast, when Sb was increased so as to attain B=3, a crystallization time was shortened substantially in an equal rate (90 ns→55 ns→22 ns), whereas a decrease in crystallization temperature was 15° C. (200° C.→195° C.→185° C.). Thus, compared with the addition of only Sn, when Sb and Sn are added, a crystallization time can be shortened while thermal stability is ensured.

Example 13

In Example 13, the relationship between values of Tc, Ta and |ΔT|/Tc (where ΔT=Tc−Ta) of the first information layer and recording characteristics of the second information layer was investigated.

The information recording medium 10a in FIG. 3 was produced in accordance with the method in Embodiment 2. The sample thus produced was measured for a change in recording sensitivity of the second information layer 14 in the case where the first information layer 13 was in an initialized state (the entire surface was in a crystal phase) or a recorded state (a crystal phase and an amorphous phase were present), by using the evaluation apparatus in FIG. 4. By varying the thickness of the first dielectric layer 16, the second dielectric layer 20, and the third dielectric layer 24, the information recording media 10a with different Tc and Ta were produced.

First, as the second substrate 12, a polycarbonate substrate with a diameter of 120 mm and a thickness of 1.1 mm was prepared. Then, on this substrate, the second information layer 14 was formed. More specifically, the second reflective layer 31 (thickness: 80 nm), the seventh interface layer 30 (thickness: 3 nm), the fifth dielectric layer 29 (thickness: 11 nm), the sixth interface layer 28 (thickness: 3 nm), the second recording layer 27 (thickness: 12 nm), the fifth interface layer 26 (thickness: 3 nm) and the fourth dielectric layer 25 (thickness: 65 nm) were formed successively by sputtering. The second recording layer 27 was made of a material represented by a composition formula: $Ge_8Sb_{26}Te_{11}$. The other layers were made of the same materials as those of the samples in Example 3.

Next, the second recording layer 27 was changed from an amorphous phase to a crystal phase to be initialized by irradiating the second information layer 14 with a laser beam.

Then, the intermediate layer 15 with grooves transferred thereon was formed on the fourth dielectric layer 25 by using UV-curable resin.

Next, the first information layer 13 was formed on the intermediate layer 15. Specifically, the third dielectric layer 24, the fourth interface layer 23 (thickness: 3 nm), the first reflective layer 22 (thickness: 10 nm), the third interface layer 21 (thickness: 3 nm), the second dielectric layer 20, the second interface layer 19 (thickness: 3 nm), the first recording layer 18 (thickness: 6 nm), the first interface layer 17 (thickness: 3 nm) and the first dielectric layer 16 were formed successively by sputtering. Next, the first recording layer 18 was changed from an amorphous phase to a crystal phase to be initialized by irradiating the first information layer 13 with a laser beam.

The first recording layer 18 was made of a material represented by a composition formula $(Ge—Sn)_8Sb_2Te_{11}$ (Sn: 10 atomic %). The other layers were made of the same materials as those in Example 3.

Next, the first information layer 13 and the first substrate 11 were attached to each other by using UV-curable resin. As the first substrate 11, a polycarbonate substrate with a diameter of 120 mm and a thickness of 0.09 mm was used. The total thickness of the adhesive layer 36 and the first substrate 11 was 0.1 mm.

By using the evaluation apparatus in FIG. 4, a 3T signal was recorded on groove portions on the second information layer at a linear velocity of 5 m/s when the first information layer 13 was in an initialized state. Pp (mW) and Pb (mW) at which a CNR of 50 dB was obtained were measured. Thereafter, a 3T signal was recorded on groove portions on the first information layer 13. Then, a 3T signal was recorded on the groove portions of the second information layer 14 where a laser beam transmitted through the recorded portions of the first information layer 13 was condensed, and a change in recording sensitivity of the second information layer 14 was measured.

A disk sample including only the first information layer 13 was produced, and Tc and Ta were measured by a spectroscope in the same way as in Example 2. Table 11 shows the measurement results. D1, D2, and D3 in Table 11 represent the thickness of the first, second, and third dielectric layers 16, 20, and 24, respectively.

TABLE 11

| Sample No. | D1 (nm) | D2 (nm) | D3 (nm) | Tc (%) | Ta (%) | \|ΔT\|/Tc | First information layer 13 | Second information layer 14 | |
|---|---|---|---|---|---|---|---|---|---|
| | | | | | | | | Pp(mW) | Pb(mW) |
| 11-1 | 110 | 22 | 17 | 54 | 48 | 0.11 | Initialized state | 9.3 | 3.4 |
| | | | | | | | Recorded state | 9.7 | 3.6 |
| 11-2 | 17 | 22 | 9 | 50 | 43 | 0.14 | Initialized state | 9.6 | 3.6 |
| | | | | | | | Recorded state | 11.0 | 4.1 |
| 11-3 | 56 | 6 | 39 | 38 | 44 | 0.16 | Initialized state | 12.6 | 4.7 |
| | | | | | | | Recorded state | 10.9 | 4.1 |
| 11-4 | 120 | 6 | 23 | 52 | 51 | 0.02 | Initialized state | 9.6 | 3.6 |
| | | | | | | | Recorded state | 9.6 | 3.6 |
| 11-5 | 40 | 6 | 23 | 51 | 52 | 0.02 | Initialized state | 9.6 | 3.6 |
| | | | | | | | Recorded state | 9.6 | 3.6 |
| 11-6 | 45 | 6 | 28 | 47 | 51 | 0.09 | Initialized state | 10.6 | 4.0 |
| | | | | | | | Recorded state | 10.5 | 4.0 |

As shown in Table 11, when $|\Delta T|/Tc$ was smaller, a change in recording sensitivity of the second information layer 14 was smaller, irrespective of the state of the first information layer 13. As a user stores a new file, using an information recording medium, a recorded region is increased. Therefore, it is preferable that Tc<Ta is satisfied so as not to involve a decrease in transmittance. A sample 11-3 has a small transmittance at (Tc+Ta)/2=41(%), and a large difference between Tc and Ta at $|\Delta T|/Tc=0.16$. In this configuration, when the first information layer 13 was in an initialized state, the recording sensitivity of the second information layer 14 was about 13 mW, and a transmittance was considered to be substantially at a lower limit. Furthermore, since the difference between Tc and Ta was large; therefore, in the case where the first information layer 13 was in a recorded state, fluctuations were caused in an amplitude of a 3T signal in the second information layer 14. Thus, $|\Delta T|/Tc$ preferably is 0.15 or less, and more preferably 0.05 or less.

In the present example, although initialization of the first information layer 13 and the second information layer 14 is conducted before attaching the first substrate 11, it may be conducted in another period. For example, initialization may be conducted after attaching the first substrate 11. Even in this case, the same results and effects are obtained.

Example 14

In Example 14, the relationship between a material and a thickness of the third dielectric layer 24, and the transmittance of the first information layer 13 was investigated by conducting calculation based on the matrix method.

Calculation was conducted assuming the structure: the polycarbonate substrate/first dielectric layer 16/first interface layer 17 (thickness: 3 nm)/first recording layer 18 (thickness: 6 nm)/second interface layer 19 (thickness: 3 nm)/second dielectric layer 20 (thickness: 23 nm)/third interface layer 21 (thickness: 3 nm)/first reflective layer 22 (thickness: 10 nm)/fourth interface layer 23 (thickness: 3 nm)/third dielectric layer 24. In the absence of the third dielectric layer 24, calculation was conducted assuming that the fourth interface layer 23 was not present.

A thickness D1 (nm) of the first dielectric layer, and Tc, Ta, Ac, and Aa when the material and the thickness of the third dielectric layer 24 were varied were calculated. Tc and Ac respectively represent a transmittance of the first information layer 13 and a light absorptivity of the first recording layer 18 in the case where the first recording layer 18 is in a crystal phase. Furthermore, Ta and Aa respectively represent a transmittance of the first information layer 13 and a light absorptivity of the first recording layer 18 in the case where the first recording layer 18 is in an amorphous phase. Table 12 shows the calculation results. The results in Table 12 show values when the thickness of the dielectric layers is set so that a reflectivity Rc (%) of the first information layer 13 in the case where the first recording layer 18 is in a crystal phase, and a reflectivity Ra (%) of the first information layer 13 in the case where the first recording layer 18 is in an amorphous phase satisfy Ra≦1 and 5≦Rc/Ra.

TABLE 12

| Calculation No. | D1 (nm) | Third dielectric layer 24 | | D3 (nm) | Tc (%) | Ta (%) | Ac (%) | Aa (%) |
| --- | --- | --- | --- | --- | --- | --- | --- | --- |
| | | Material | Refractive index | | | | | |
| 12-1 | 55 | None | | | 40 | 42 | 47 | 54 |
| 12-2 | 50 | MgO | 1.7 | 34 | 45 | 45 | 46 | 51 |
| | | Al$_2$O$_3$ | | | | | | |
| 12-3 | 50 | AlN | 1.9 | 34 | 45 | 46 | 45 | 51 |
| 12-4 | 50 | Al—Ti—N | 2.0 | 23 | 48 | 48 | 42 | 48 |
| | | ZnTe—O | | | | | | |
| 12-5 | 45 | ZnS—SiO$_2$ | 2.3 | 17 | 51 | 50 | 41 | 46 |
| | | ZnO | | | | | | |
| | | ZrO$_2$—SiO$_2$ | | | | | | |
| 12-6 | 45 | TeO$_2$ | 2.5 | 17 | 52 | 52 | 40 | 45 |
| | | Ta$_2$O$_5$ | | | | | | |
| | | ZrO$_2$ | | | | | | |
| 12-7 | 40 | TiO$_2$ | 2.8 | 17 | 53 | 53 | 39 | 44 |

As shown in Table 12, in the absence of the third dielectric layer 24, Tc and Ta were 42% or less. In contrast, it was possible to set Tc and Ta at 45% or more by forming the third dielectric layer 24. Furthermore, it was confirmed by calculation that as a refractive index is larger, Tc and Ta can be increased. In order to set a transmittance of 50% or more, it is preferable to form the third dielectric layer 24 of a material with a refractive index of 2.3 or more.

Next, in order to verify the calculation results, the first information layer 13 was produced actually, and a transmittance thereof was measured by a spectrometer.

The first information layer 13 was produced by the following method. First, a polycarbonate substrate with a diameter of 120 mm and a thickness of 1.1 mm was prepared. On this substrate, the third dielectric layer 24, the fourth interface layer 23 (thickness: 3 nm), the first reflective layer 22 (thickness: 10 nm), the third interface layer 21 (thickness: 3 nm), the second dielectric layer 20 (thickness: 23 nm), the second interface layer 19 (thickness: 3 nm), the first recording layer 18 (thickness: 6 nm), the first interface layer 17 (thickness: 3 nm) and the first dielectric layer 16 were stacked successively. The dielectric layers excluding the third dielectric layer 24 and the interface layers were made of the same materials as those for the samples in Example 3. The first recording layer 18 was made of a material represented by a composition formula: (Ge—Sn)$_8$Sb$_2$Te$_{11}$ (Sn: 10 atomic %). Then, a plurality of samples with the material and thickness of the third dielectric layer 24 varied and with the thickness of the first dielectric layer 16 varied were produced. For comparison, a sample also was produced in which the fourth interface layer 23 and the third dielectric layer 24 were not formed. These samples were measured for a transmittance Tc and Ta of the first information layer, and Table 13 shows the results.

TABLE 13

| D1 (nm) | Third dielectric layer 24 | | | Tc (%) | Ta (%) |
| --- | --- | --- | --- | --- | --- |
| | Material | | D3 (nm) | | |
| 13-1 | 55 | None | | | 39 | 41 |
| 13-2 | 50 | MgO | | 34 | 44 | 46 |
| 13-3 | 50 | Al$_2$O$_3$ | | 34 | 45 | 45 |
| 13-4 | 50 | AlN | | 34 | 45 | 45 |
| 13-5 | 50 | Al—Ti—N | | 23 | 49 | 48 |
| 13-6 | 50 | ZnTe—O | | 23 | 47 | 48 |
| 13-7 | 45 | ZnS—SiO$_2$ | | 17 | 50 | 50 |

TABLE 13-continued

| D1 (nm) | Third dielectric layer 24 | | Tc (%) | Ta (%) |
| --- | --- | --- | --- | --- |
| | Material | D3 (nm) | | |
| 13-8 | 45 | ZnO | 17 | 51 | 49 |
| 13-9 | 45 | ZrO$_2$—SiO$_2$ | 17 | 49 | 50 |
| 13-10 | 45 | TeO$_2$ | 17 | 52 | 52 |
| 13-11 | 45 | Ta$_2$O$_5$ | 17 | 52 | 51 |
| 13-12 | 45 | ZrO$_2$ | 17 | 52 | 51 |
| 13-13 | 40 | TiO$_2$ | 17 | 54 | 53 |

As shown in Table 13, results substantially in accordance with the calculation were obtained. In samples 13-7 to 13-13, a transmittance of 50% or more was obtained. In this manner, by forming the third dielectric layer 24, the transmittance of the first information layer 13 was enhanced remarkably.

As described above, exemplary embodiments of the present invention have been described. However, the present invention is not limited thereto, and is applicable to other embodiments based on the technical idea of the present invention.

As described above, according to the information recording medium and method for producing the same of the present invention, an information recording medium can be obtained, in which two recording layers are provided so as to conduct high-density recording.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An information recording medium, comprising:
a first substrate;
a second substrate disposed so as to be opposed to the first substrate;
a first information layer disposed between the first substrate and the second substrate;
a second information layer disposed between the first information layer and the second substrate; and
an intermediate layer disposed between the first information layer and the second information layer, wherein the first information layer includes a first recording layer that is transformed in phase reversibly between a crystal phase and an amorphous phase with a laser beam radiated from the first substrate side, the second information layer includes a second recording layer that is transformed in phase reversibly between a crystal phase and an amorphous phase with the laser beam, and the first recording layer contains Ge, Sn, Sb, and Te, and has a thickness of 9 nm or less.

2. An information recording medium according to claim 1, wherein the first recording layer is made of a material represented by a composition formula:

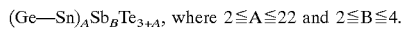

$(Ge\text{—}Sn)_A Sb_B Te_{3+A}$, where $2 \leq A \leq 22$ and $2 \leq B \leq 4$.

3. An information recording medium according to claim 2, wherein a content of Sn in the first recording layer is 25 atomic % or less.

4. An information recording medium according to claim 1, wherein a transmittance Tc (%) of the first information layer in a case where the first recording layer is in a crystal phase, and a transmittance Ta (%) of the first information layer in a case where the first recording layer is in an amorphous phase satisfy $40 \leq (Tc+Ta)/2$ with respect to a laser beam having a wavelength in a range of 390 nm to 430 nm.

5. An information recording medium according to claim 4, wherein the transmittance Tc (%) and the transmittance Ta (%) satisfy $0 \leq |Tc-Ta|/Tc \leq 0.15$ with respect to a laser beam having a wavelength in a range of 390 nm to 430 nm.

6. An information recording medium according to claim 1, wherein the first information layer further includes first and second dielectric layers and a first reflective layer, and the first reflective layer, the second dielectric layer, the first recording layer, and the first dielectric layer are disposed in this order from the intermediate layer side to the first substrate side.

7. An information recording medium according to claim 6, wherein the first information layer further includes a third dielectric layer disposed between the first reflective layer and the intermediate layer.

8. An information recording medium according to claim 7, wherein a refractive index of the third dielectric layer is 2.3 or more with respect to light having a wavelength in a range of 390 nm to 430 nm.

9. An information recording medium according to claim 7, wherein grooves for tracking control are formed on the intermediate layer.

10. An information recording medium according to claim 7, wherein the first information layer further includes an interface layer disposed at at least one interface selected from the group consisting of an interface between the first dielectric layer and the first recording layer, an interface between the first recording layer and the second dielectric layer, an interface between the second dielectric layer and the first reflective layer, and an interface between the first reflective layer and the third dielectric layer.

11. An information recording medium according to claim 6, wherein a thickness of the first reflective layer is in a range of 5 nm to 15 nm.

12. An information recording medium according to claim 6, wherein a thickness of the first substrate is in a range of 10 μm to 700 μm.

13. An information recording medium according to claim 12, wherein grooves for tracking control are formed on the first substrate.

14. An information recording medium according to claim 1, wherein a thickness of the second substrate is in a range of 500 μm to 1300 μm.

15. An information recording medium according to claim 14, wherein grooves for tracking control are formed on the second substrate.

16. An information recording medium according to claim 7, wherein the second information layer further includes fourth and fifth dielectric layers and a second reflective layer, and the second reflective layer, the fifth dielectric layer, the second recording layer, and the fourth dielectric layer are disposed in this order from the second substrate side to the intermediate layer side.

17. An information recording medium according to claim 16, wherein the second information layer further includes an interface layer disposed at at least one interface selected from the group consisting of an interface between the fourth dielectric layer and the second recording layer, an interface between the second recording layer and the fifth dielectric layer, and an interface between the fifth dielectric layer and the second reflective layer.

18. A method for producing an information recording medium comprising first and second substrates, first and second information layers, and an intermediate layer, the method comprising the processes of.

(a) forming the second information layer on the second substrate;

(b) forming the intermediate layer on the second information layer;

(c) forming the first information layer on the intermediate layer; and (d) attaching the first substrate onto the first information layer, wherein the first information layer includes a first recording layer that is transformed in phase reversibly between a crystal phase and an amorphous phase with a laser beam radiated from the first substrate side, the second information layer includes a second recording layer that is transformed in phase reversibly between a crystal phase and an amorphous phase with the laser beam, and the process (c) includes the process of forming the first recording layer to a thickness of 9 nm or less, using a base material containing Ge, Sn, Sb, and Te.

19. A method for producing an information recording medium according to claim 18, wherein, in the process (c), the first recording layer is formed by sputtering using sputtering gas containing argon gas or krypton gas.

20. A method for producing an information recording medium according to claim 19, wherein the sputtering gas further contains at least one gas selected from the group consisting of oxygen and nitrogen.

21. A method for producing an information recording medium according to claim 19, wherein the first recording layer is formed at a film-formation speed in a range of 0.1 nm/second to 10 nm/second.

22. A method for producing an information recording medium according to claim 18, wherein, in the process (b), grooves for tracking control are formed on a surface of the intermediate layer.

23. A method for producing an information recording medium according to claim 18, wherein the first information layer further includes a first reflective layer disposed on the intermediate layer side from the first recording layer, and the process (c) includes the process of forming the first reflective layer to a thickness in a range of 5 nm to 15 nm.

24. A method for recording/reproducing information with respect to an information recording medium by irradiating the information recording medium with a laser beam, wherein the information recording medium is the information recording medium of claim 1, the laser beam is incident from the first information layer side of the information recording medium, in the second information layer of the information recording medium, information is recorded/reproduced with the laser beam transmitted through the first information layer, and a wavelength of the laser beam is in a range of 390 nm to 430 nm.

25. A method for recording/reproducing information with respect to an information recording medium according to claim 24, wherein a linear velocity of the information recording medium in recording/reproducing information is in a range of 1 m/second to 50 m/second.

26. A method for recording/reproducing information with respect to an information recording medium according to claim 24, wherein the laser beam is a laser beam condensed by an objective lens with a numerical aperture NA in a range of 0.4 to 1.1.

* * * * *

UNITED STATES PATENT AND TRADEMARK OFFICE
CERTIFICATE OF CORRECTION

PATENT NO. : 6,751,184 B2
APPLICATION NO. : 09/903285
DATED : June 15, 2004
INVENTOR(S) : Kojima et al.

It is certified that error appears in the above-identified patent and that said Letters Patent is hereby corrected as shown below:

Col. 32, line 27, claim 18: "comprising the processes of." should read --comprising the processes of:--

Signed and Sealed this

Fourteenth Day of November, 2006

JON W. DUDAS
*Director of the United States Patent and Trademark Office*